US010191362B2

(12) United States Patent
Okamoto et al.

(10) Patent No.: US 10,191,362 B2
(45) Date of Patent: *Jan. 29, 2019

(54) LIGHT SOURCE UNIT AND PROJECTOR

(71) Applicant: Ushio Denki Kabushiki Kaisha, Tokyo (JP)

(72) Inventors: Masashi Okamoto, Tokyo (JP); Takanori Samejima, Tokyo (JP); Fumihiko Oda, Tokyo (JP)

(73) Assignee: USHIO DENKI KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/425,780

(22) Filed: Feb. 6, 2017

(65) Prior Publication Data

US 2017/0146897 A1    May 25, 2017

Related U.S. Application Data

(63) Continuation of application No. PCT/JP2015/071268, filed on Jul. 27, 2015.

(30) Foreign Application Priority Data

Aug. 8, 2014 (JP) ................................. 2014-162045

(51) Int. Cl.
*G03B 21/20* (2006.01)
*H04N 9/31* (2006.01)
(Continued)

(52) U.S. Cl.
CPC ..... *G03B 21/2053* (2013.01); *G03B 21/2033* (2013.01); *G03B 33/06* (2013.01);
(Continued)

(58) Field of Classification Search
None
See application file for complete search history.

(56) References Cited

U.S. PATENT DOCUMENTS

| 4,998,043 A * | 3/1991 | Unami ................ G01N 21/255 |
| | | 250/205 |
| 7,166,966 B2 * | 1/2007 | Naugler, Jr. ........ G06F 3/03542 |
| | | 257/E27.129 |

(Continued)

FOREIGN PATENT DOCUMENTS

| JP | H10-133303 A | 5/1998 |
| JP | 2001-142141 A | 5/2001 |

(Continued)

OTHER PUBLICATIONS

International Search Report issued in Application No. PCT/JP2015/071268, dated Oct. 20, 2015.

*Primary Examiner* — Douglas W Owens
*Assistant Examiner* — Srinivas Sathiraju
(74) *Attorney, Agent, or Firm* — Michael Best & Friedrich LLP

(57) ABSTRACT

A light source unit includes: elemental light sources each including light emitting elements and drive circuits; an integrated control circuit that controls the drive circuits; and band optical characteristic acquisition sections that receive light of an amount correlated with a total light amount of output luminous fluxes to acquire light emitting intensity indicating values and wavelength deviation indicating values. The integrated control circuit at least intermittently acquires band optical characteristic acquisition data to generate the light emitting intensity indicating values and the wavelength deviation indicating values. The integrated control circuit holds light emitting intensity indicating value target variation information, and determines the variation of the light emitting intensity indicating values, in accordance (Continued)

with the light emitting intensity indicating value target variation information belonging to one appearance mode of the wavelength deviation indicating values assumed on a basis of an actual mode of the generated wavelength deviation indicating values.

9 Claims, 8 Drawing Sheets

(51) Int. Cl.
 *H05B 37/02* (2006.01)
 *G03B 33/06* (2006.01)
(52) U.S. Cl.
 CPC ......... *H04N 9/3155* (2013.01); *H04N 9/3161* (2013.01); *H04N 9/3164* (2013.01); *H04N 9/3182* (2013.01); *H04N 9/3194* (2013.01); *H05B 37/0227* (2013.01)

(56) References Cited

U.S. PATENT DOCUMENTS

| | | | |
|---|---|---|---|
| 8,148,921 B2* | 4/2012 | Elberbaum | G08C 23/06 315/363 |
| 8,950,873 B2* | 2/2015 | Okamoto | G02F 1/29 353/85 |
| 9,380,686 B2* | 6/2016 | Samejima | H05B 41/2887 |
| 9,408,275 B2* | 8/2016 | Maxik | A01G 7/045 |
| 9,414,454 B2* | 8/2016 | Brandes | H05B 33/086 |
| 9,482,935 B2* | 11/2016 | Tatsumi | G03B 21/2033 |
| 9,488,849 B2* | 11/2016 | Shimizu | G02B 27/48 |
| 9,509,967 B2* | 11/2016 | Samejima | G03B 21/2033 |
| 9,581,883 B2* | 2/2017 | Smits | G02B 26/101 |
| 9,581,885 B2* | 2/2017 | Samejima | G03B 21/2033 |
| 9,615,069 B2* | 4/2017 | Okamoto | H04N 9/3155 |
| 9,616,469 B2* | 4/2017 | Habu | B08B 7/0057 |
| 9,749,603 B2* | 8/2017 | Okamoto | H04N 9/3155 |
| 2005/0073845 A1* | 4/2005 | Matsui | H04N 9/315 362/293 |
| 2011/0043764 A1* | 2/2011 | Narikawa | G03B 21/204 353/31 |
| 2013/0335710 A1* | 12/2013 | Okamoto | G02F 1/29 353/30 |
| 2014/0036240 A1* | 2/2014 | Samejima | H05B 41/36 353/85 |
| 2015/0029475 A1* | 1/2015 | Shimizu | G02B 27/48 353/98 |
| 2015/0331304 A1* | 11/2015 | Okamoto | H04N 9/3155 353/85 |
| 2015/0380898 A1* | 12/2015 | Okamoto | G03B 21/2033 353/85 |
| 2016/0255313 A1* | 9/2016 | Samejima | G03B 21/2033 353/85 |
| 2016/0353070 A1* | 12/2016 | Okamoto | H05B 33/0869 |
| 2017/0146897 A1* | 5/2017 | Okamoto | G03B 21/2053 |

FOREIGN PATENT DOCUMENTS

| | | |
|---|---|---|
| JP | 2004-252112 A | 9/2004 |
| JP | 2006-252777 A | 9/2006 |
| JP | 2007-156211 A | 6/2007 |
| JP | 2008-134378 A | 6/2008 |

\* cited by examiner

LIGHT SOURCE UNIT AND PROJECTOR

CROSS REFERENCE TO RELATED APPLICATIONS

This is a continuation of International Application No. PCT/JP2015/071268, filed Jul. 27, 2015, which claims the benefit of Japanese Priority Patent Application JP2014-162045, filed Aug. 8, 2014, the entire contents of these applications are incorporated herein by reference in their entirety.

BACKGROUND

The disclosure relates to a light source unit that is usable in an optical apparatus such as a projector and uses light emitting elements such as semiconductor lasers for a plurality of different wavelength bands, and to a projector using the light source unit.

Technologies relating to a light source unit and a projector using the light source unit have been proposed, for example, in Unexamined Patent Application Publication Nos. 2006-252777, 2007-156211, and 2008-134378.

SUMMARY

A light source unit according to an embodiment of the disclosure includes: a plurality of elemental light sources each including light emitting elements and drive circuits, the light emitting elements that emit light of an emission wavelength including a plurality of different wavelength bands, and the drive circuits respectively driving the light emitting elements; an integrated control circuit that controls the drive circuits; and band optical characteristic acquisition sections that receive light of an amount correlated with a total light amount of output luminous fluxes to acquire light emitting intensity indicating values correlated with light intensity for the respective different wavelength bands and to acquire wavelength deviation indicating values correlated with deviation from a reference wavelength for one or more of the different wavelength bands, the output luminous fluxes being collection of light beams emitted from light emitting elements. The integrated control circuit at least intermittently acquires band optical characteristic acquisition data to generate the light emitting intensity indicating values and the wavelength deviation indicating values, the band optical characteristic acquisition data being generated by the band optical characteristic acquisition sections, and the integrated control circuit holds light emitting intensity indicating value target variation information, the light emitting intensity indicating value target variation information being used to reduce difference between color phase indicating values correlated with the integrated light color of the output luminous fluxes and target color phase indicating values by feedback control of the drive circuits, the feedback control being performed to reduce difference between the light emitting intensity indicating values and target light emitting intensity indicating values for the respective different wavelength bands, and the light emitting intensity indicating value target variation information being used for determination of variation of the light emitting intensity indicating values with respect to the target light emitting intensity indicating values for the respective different wavelength bands matched to each of assumed appearance modes of the wavelength deviation indicating values. The integrated control circuit determines the variation of the light emitting intensity indicating values for the respective different wavelength bands, in accordance with the light emitting intensity indicating value target variation information belonging to one appearance mode assumed on a basis of an actual mode of the generated wavelength deviation indicating values, out of the appearance modes of the wavelength deviation indicating values.

In the light source unit according to the embodiment of the disclosure, the light emitting intensity indicating value target variation information held by the integrated control circuit may be calculated and generated by solving an equation, the equation representing, using the variation of the light emitting intensity indicating values, variation of the color phase indicating values when the light emitting intensity indicating values are slightly varied for the respective different wavelength bands.

A projector according to an embodiment of the disclosure is provided with a light source unit and a projection display section that performs projection display of an image with use of the light source unit. The light source unit includes: a plurality of elemental light sources each including light emitting elements and drive circuits, the light emitting elements that emit light of an emission wavelength including a plurality of different wavelength bands, and the drive circuits respectively driving the light emitting elements; an integrated control circuit that controls the drive circuits; and band optical characteristic acquisition sections that receive light of an amount correlated with a total light amount of output luminous fluxes to acquire light emitting intensity indicating values correlated with light intensity for the respective different wavelength bands and to acquire wavelength deviation indicating values correlated with deviation from a reference wavelength for one or more of the different wavelength bands, the output luminous fluxes being collection of light beams emitted from light emitting elements. The integrated control circuit at least intermittently acquires band optical characteristic acquisition data to generate the light emitting intensity indicating values and the wavelength deviation indicating values, the band optical characteristic acquisition data being generated by the band optical characteristic acquisition sections, and the integrated control circuit holds light emitting intensity indicating value target variation information, the light emitting intensity indicating value target variation information being used to reduce difference between color phase indicating values correlated with the integrated light color of the output luminous fluxes and target color phase indicating values by feedback control of the drive circuits, the feedback control being performed to reduce difference between the light emitting intensity indicating values and target light emitting intensity indicating values for the respective different wavelength bands, and the light emitting intensity indicating value target variation information being used for determination of variation of the light emitting intensity indicating values with respect to the target light emitting intensity indicating values for the respective different wavelength bands matched to each of assumed appearance modes of the wavelength deviation indicating values. The integrated control circuit determines the variation of the light emitting intensity indicating values for the respective different wavelength bands, in accordance with the light emitting intensity indicating value target variation information belonging to one appearance mode assumed on a basis of an actual mode of the generated wavelength deviation indicating values, out of the appearance modes of the wavelength deviation indicating values.

It is to be understood that both the foregoing general description and the following detailed description are exemplary, and are intended to provide further explanation of the technology as claimed. Effects achieved by the disclosure may be those that are different from the above-described effects, or may include other effects in addition to those described above.

DETAILED DESCRIPTION

First, for example, projectors according to reference examples are described below.

For example, in an image display projector such as DLP (trademark) projector and a liquid crystal projector and in a photomask exposure apparatus, a high luminance discharge lamp (HID lamp) such as a xenon lamp and an ultra-high pressure mercury lamp has been used so far.

As an example, a principle of a projector is described with reference to FIG. 8 that is a diagram to explain a portion of one kind of projectors according to a reference example (see Japanese Unexamined Patent Application Publication No. 2004-252112, for example).

Light from a light source (SjA) that is configured of, for example, a high luminance discharge lamp enters an incident end (PmiA) of a homogenizing means (FmA) with the help of condensing means (illustration thereof is omitted) that is configured of, for example, a concave reflector or a lens, and resultant light is outputted from an exit end (PmoA).

Here, as the homogenizing means (FmA), for example, a light guide may be used. The light guide is also referred to as a rod integrator or a light tunnel, and is configured of a prism made of a light transmissive material such as glass and a resin. The light entering the incident end (PmiA) is totally reflected repeatedly by side surfaces of the homogenizing means (FmA) and propagates through the homogenizing means (FmA), in accordance with the principle same as that of the optical fiber. Accordingly, even if distribution of the light entering the incident end (PmiA) has unevenness, the homogenizing means (FmA) functions to sufficiently homogenize illuminance of the exit end (PmoA).

Note that, in addition to the light guide configured of a prism made of a light transmissive material such as glass and a resin described above, there is a light guide that is a hollow square tube and whose inner surface is configured of a reflector. The light guide of this type performs the same function as that of the light guide configured of a prism, by causing light to propagate while allowing the light to be reflected repeatedly by the inner surface.

When an illumination lens (Ej1A) is so disposed as to cause a square image of the exit end (PmoA) to be formed on a two-dimensional optical amplitude modulator (DmjA), the two-dimensional optical amplitude modulator (DmjA) is illuminated with the light outputted from the exit end (PmoA).

Figure 8:
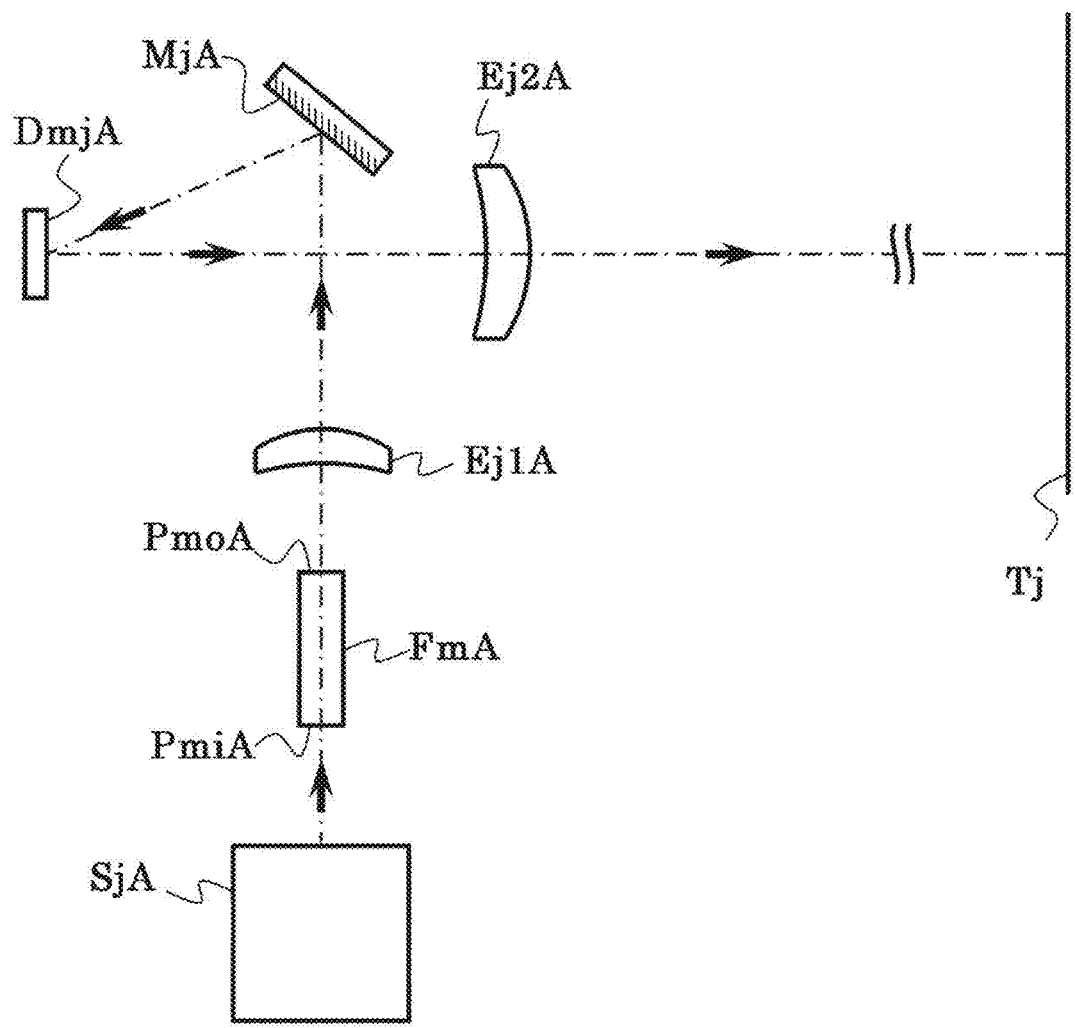
FIG. 8 is a diagram to explain one form of a portion of one kind of projectors according to a reference example.

In FIG. 8, however, a mirror (MjA) is disposed between the illumination lens (Ej1A) and the two-dimensional optical amplitude modulator (DmjA).

The two-dimensional optical amplitude modulator (DmjA) then so modulates the light as to direct the modulated light in a direction in which the light enters a projection lens (Ej2A) or in a direction in which the light does not enter the projection lens (Ej2A) for each pixel, thereby displaying an image on a screen (Tj).

The two-dimensional optical amplitude modulator as mentioned above is also referred to as a light valve. In the case of the optical system of FIG. 8, a digital micro-mirror device (DMD, trademark) is normally used as the two-dimensional optical amplitude modulator (DmjA).

Figure 9:
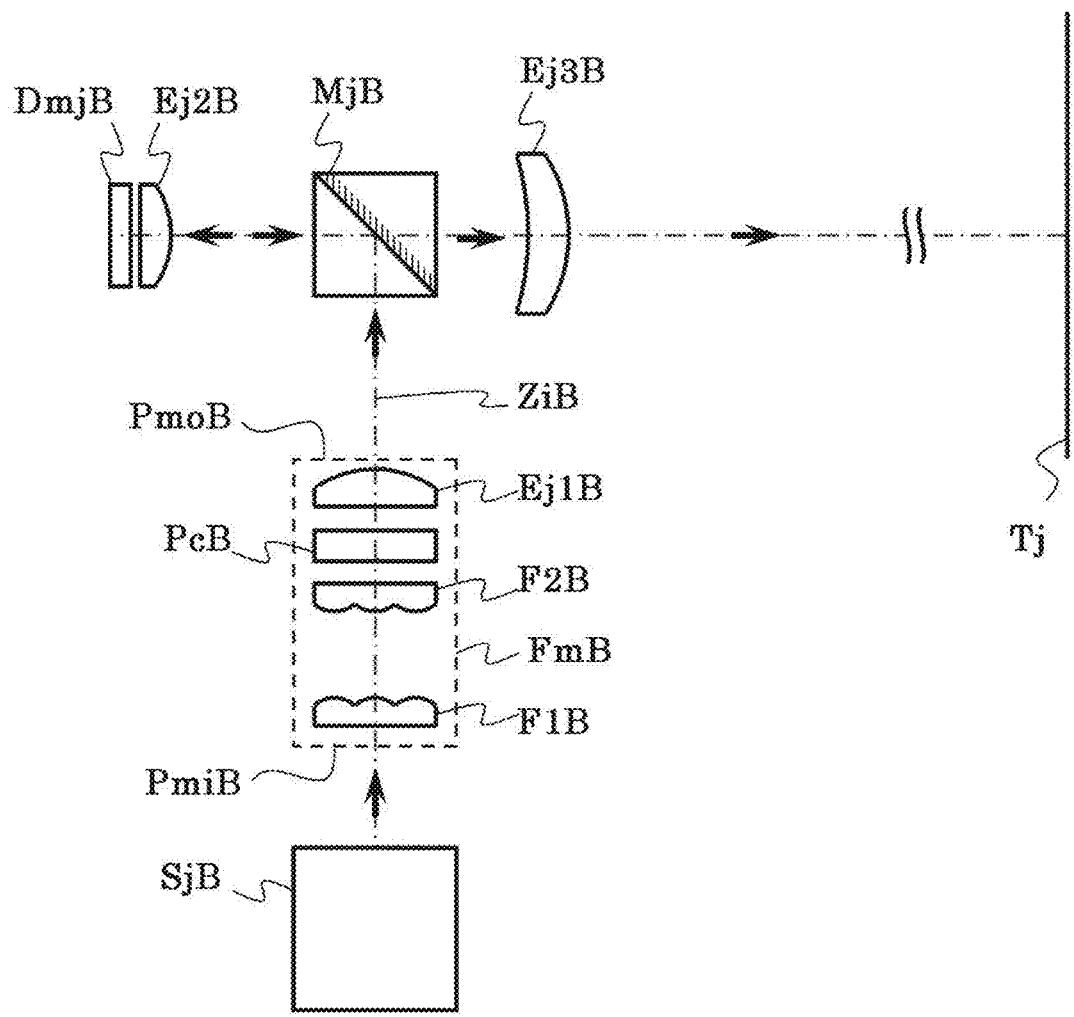
FIG. 9 is a diagram to explain one form of a portion of one kind of projectors according to another reference example.

In addition to the above-described light guide, the homogenizing means includes a fly eye integrator. A principle of a projector using the fly eye integrator as the homogenizing means is described with reference to FIG. 9, as an example. FIG. 9 is a diagram to explain a portion of one kind of projectors according to another reference example (see Japanese Unexamined Patent Application Publication No. 2001-142141, for example).

Light from a light source (SjB) configured of, for example, a high luminance discharge lamp enters, as a substantially parallel luminous flux, an incident end (PmiB) of homogenizing means (FmB) configured of a fly eye integrator with the help of collimator means (illustration thereof is omitted) configured of, for example, a concave reflector or a lens, and resultant light is outputted from an exit end (PmoB).

In this example, the homogenizing means (FmB) is configured of a combination of a front fly eye lens (F1B) on incident side, and a rear fly eye lens (F2B) and an illumination lens (Ej1B) on exit side.

Each of the front fly eye lens (F1B) and the rear fly eye lens (F2B) is formed by vertically and horizontally arranging a plurality of square lenses that have the same focal distance and the same shape.

Each lens of the front fly eye lens (F1B) and a corresponding lens of the rear fly eye lens (F2B) configure a Kohler illumination optical system. Therefore, a plurality of Kohler illumination optical systems are arranged vertically and horizontally.

Typically, the Kohler illumination optical system is configured of two lenses, of which a front lens collects light to illuminate a target surface (a surface desired to be illuminated) uniformly. At this time, the two lenses are disposed such that the front lens forms a light source image not on the target surface but on a center of a surface of a rear lens and the rear lens forms an image of an outer square shape of the front lens on the target surface.

The action of the rear lens is to prevent a phenomenon in which illuminance in the periphery of the square image formed on the target surface is dropped depending on the size of the light source when the light source is not a complete point light source but has a finite size. The phenomenon occurs when the rear lens is not provided. The rear lens makes it possible to uniform illuminance over the periphery of the square image on the target surface, without depending on the size of the light source.

Here, in the case of the optical system in FIG. 9, a substantially parallel luminous flux basically enters the homogenizing means (FmB). Accordingly, the front fly eye lens (FIB) and the rear fly eye lens (F2B) are disposed such that a distance therebetween becomes equal to the focal distance thereof, and therefore, an image on the target surface of uniform illumination as the Kohler illumination optical system is generated to the infinity.

Since the illumination lens (Ej1B) is, however, disposed on a rear stage of the rear fly eye lens (F2B), the target surface is drawn on a focal plane of the illumination lens (Ej1B) from the infinity.

Each of the plurality of Kohler illumination optical systems arranged vertically and horizontally is parallel to an incident optical axis (ZiB), and a luminous flux enters each of the Kohler illumination optical systems substantially axisymmetrically to the center axis thereof. Therefore, an output luminous flux is also axisymmetrical. Accordingly, images of the outputs of all of the Kohler illumination optical systems are formed on the same target surface on the focal plane of the illumination lens (Ej1B) by property of the lens in which light beams entering a lens surface at the same angle are so refracted as to travel toward the same point on the focal plane irrespective of incident positions of the respective light beams on the lens surface, namely, by Fourier transform function of the lens.

As a result, illumination distributions on the surfaces of the respective lenses of the front fly eye lens (F1B) are all overlapped, and thus a synthesized square image, whose illuminance distribution is more uniform than that in the case of one Kohler illumination optical system, is formed on the incident optical axis (ZiB).

When the two-dimensional optical amplitude modulator (DmjB) is disposed on the position of the synthesized square image, the two-dimensional optical amplitude modulator (DmjB) that is an illumination target is illuminated with the light outputted from the exit end (PmoB).

In the illumination, however, a polarization beam splitter (MjB) is disposed between the illumination lens (Ej1B) and the two-dimensional optical amplitude modulator (DmjB) to reflect the light toward the two-dimensional optical amplitude modulator (DmjB).

The two-dimensional optical amplitude modulator (DmjB) modulates the light and reflects the modulated light such that the polarization direction of light for each pixel is rotated by 90 degrees or is not rotated, in accordance with a picture signal. This allows only the rotated light to pass through the polarization beam splitter (MjB) and to enter a projection lens (Ej3B), thereby displaying an image on the screen (Tj).

In the case of the optical system in FIG. 9, a silicon liquid crystal device (LCOS, trademark) is typically used as the two-dimensional optical amplitude modulator (DmjB).

In a case of such a liquid crystal device, only a component of light in a specified polarization direction is effectively modulated. A component of light parallel to the specified polarization direction is normally transmitted as is. In the optical system in FIG. 9, however, a polarization aligning device (PcB) that rotates the polarization direction of only a component of light perpendicular to the specified polarization direction by 90 degrees and consequently allows all of light to be effectively used, may be interposed, for example, on a rear stage of the rear fly eye lens (F2B).

In addition, for example, a field lens (Ej2B) may be interposed just in front of the two-dimensional optical amplitude modulator (DmjB) such that substantially parallel light enters the two-dimensional optical amplitude modulator (DmjB).

Note that, in addition to the reflective two-dimensional optical amplitude modulator as illustrated in FIG. 9, a transmissive liquid crystal device (LCD) is also used with a compatible optical arrangement as the two-dimensional optical amplitude modulator (see Japanese Unexamined Patent Application Publication No. H10-133303, for example).

In a common projector, to perform color display of an image, for example, a dynamic color filter such as a color wheel is disposed on the rear stage of the homogenizing means to illuminate the two-dimensional optical amplitude modulator with color sequential luminous fluxes of R (red), G (green), and B (blue), and color display is thus achieved time-divisionally. Alternatively, an optical system is configured. In the optical system, a dichroic mirror or a dichroic prism is disposed on the rear stage of the homogenizing means to illuminate the two-dimensional optical amplitude modulator that is provided independently for each color, with light color-separated to three primary colors R, G, and B, and a dichroic mirror or a dichroic prism is disposed to perform color synthesis of the modulated luminous fluxes of the three primary colors R, G, and B. These are however omitted in order to avoid complication in FIG. 8 and FIG. 9.

The above-described high luminance discharge lamp has, as issues, low conversion efficiency from supplied power into optical power, namely, has large heating loss, or short lifetime.

As an alternate light source overcoming these issues, a solid-state light source such as an LED and a semiconductor laser has attracted attention in recent years.

Among them, the LED has smaller heating loss and longer life time as compared with the discharge lamp. However, light radiated from the LED does not have directivity similarly to the discharge lamp. This causes low usage efficiency of light in an application using only light in a certain direction, such as the projector and an exposure apparatus.

In contrast, the semiconductor laser has a disadvantage that speckle is caused by high coherency, but the disadvantage is overcome by various technical improvement such as usage of a diffuser plate. Since the semiconductor laser has small heating loss and long lifetime similarly to LED and has high directivity, the semiconductor laser advantageously has high usage efficiency of light in application using only light in a certain direction, such as the projector and the exposure apparatus described above.

Moreover, the semiconductor laser utilizes high directivity to perform optical transmission by optical fibers with high efficiency. This makes it possible to separate the installation position of the semiconductor laser from the position of, for example, a projector using the light, which allows for enhancement of flexibility of device designing.

Emission wavelength and light emitting intensity of the semiconductor laser, however, vary due to variation of environment temperature or temperature increase by self-heating even when the same current flows.

Further, deterioration of light emitting intensity is overlapped therewith along with deterioration associated with the increase of accumulated energization time.

When the semiconductor laser is used as a light source of the projector for some or all of the three primary colors R, G, and B, color and brightness of the entire image may vary due to such variation.

Therefore, to apply the semiconductor laser to a high-fidelity projector, it is necessary to perform stabilization of color, namely, stabilization of white balance and stabilization of brightness.

When white light is created by mixing light from light sources of three primary colors R, G, and B, a mixing ratio of the three primary colors may be normally adjusted such that correct white light is obtained, while measuring chromaticity with use of a color meter in a case of manual creation by a person. In contrast, it is difficult for a projector to achieve automatic adjustment with low cost.

To measure the chromaticity or to efficiently automatically adjust power supplied to the semiconductor laser of the primary colors R, G, and B on the basis of measurement results as described later, it is necessary to perform complicated calculation such as solving of simultaneous equations, which causes an excessive calculation load for an embedded microprocessor. A processing method of performing such a calculation in a simplified manner, however, has not been developed.

Technology to avoid an issue of, in particular, a phenomenon in which emission wavelength is varied when a semiconductor laser or an LED is applied as a light source has been developed.

For example, Japanese Unexamined Patent Application Publication No. 2006-252777 discloses a technology in which it is determined whether a gradient of spectral sensitivity characteristics is varied in a direction with a longer emission wavelength or in a direction with a shorter emission wavelength, or is not varied, through light amount detection that is performed for an emission wavelength band of a light source with use of a positive optical sensor and a negative optical sensor, and a reference level of power supply control of light sources of the respective colors R, G, and B is increased or decreased on the basis of the determination result.

In the case of this technology, however, only the direction of the temporal variation of the emission wavelength is detected and controlled. Therefore, color variation at a relatively high rate associated with temperature variation caused by heat generation of the light source itself immediately after turning-on of the light source is corrected, but the color variation associated with moderate variation of the environment temperature and deterioration of the light source over long term may not be corrected disadvantageously.

Moreover, the method of power supply control for each of the color light sources when color variation of the light sources of a plurality of colors occurs independently, has not been solved.

Further, for example, Japanese Unexamined Patent Application Publication No. 2007-156211 discloses a technology allowing light sources of the respective colors R, G, and B to emit light color-sequentially. By the technology, white balance is corrected by performing control such that difference between outputs of the optical sensors and the target values thereof becomes small while assuming that the spectral sensitivity distribution of the optical sensors of the respective colors R, G, and B is equivalent to that of the color matching function in the XYZ color system recommended by Commission International de l'Éclairage (CIE).

In the feedback control of the white balance, however, how to vary the supplied power of each of the light sources of the three colors in order to converge the output of the optical sensors to the target values has not been solved.

Moreover, Japanese Unexamined Patent Application Publication No. 2008-134378 discloses a technology in which an angle of a dichroic mirror is varied on the basis of a detection result of a photodetection sensor that detects output and a color from an LED light source, and an undesirable wavelength component of light emitted from the LED is discarded to correct color. The technology, however, has low efficiency due to the discard of undesirable light, and a method of achieving a photodetection sensor detecting color is not developed.

Figure 1:
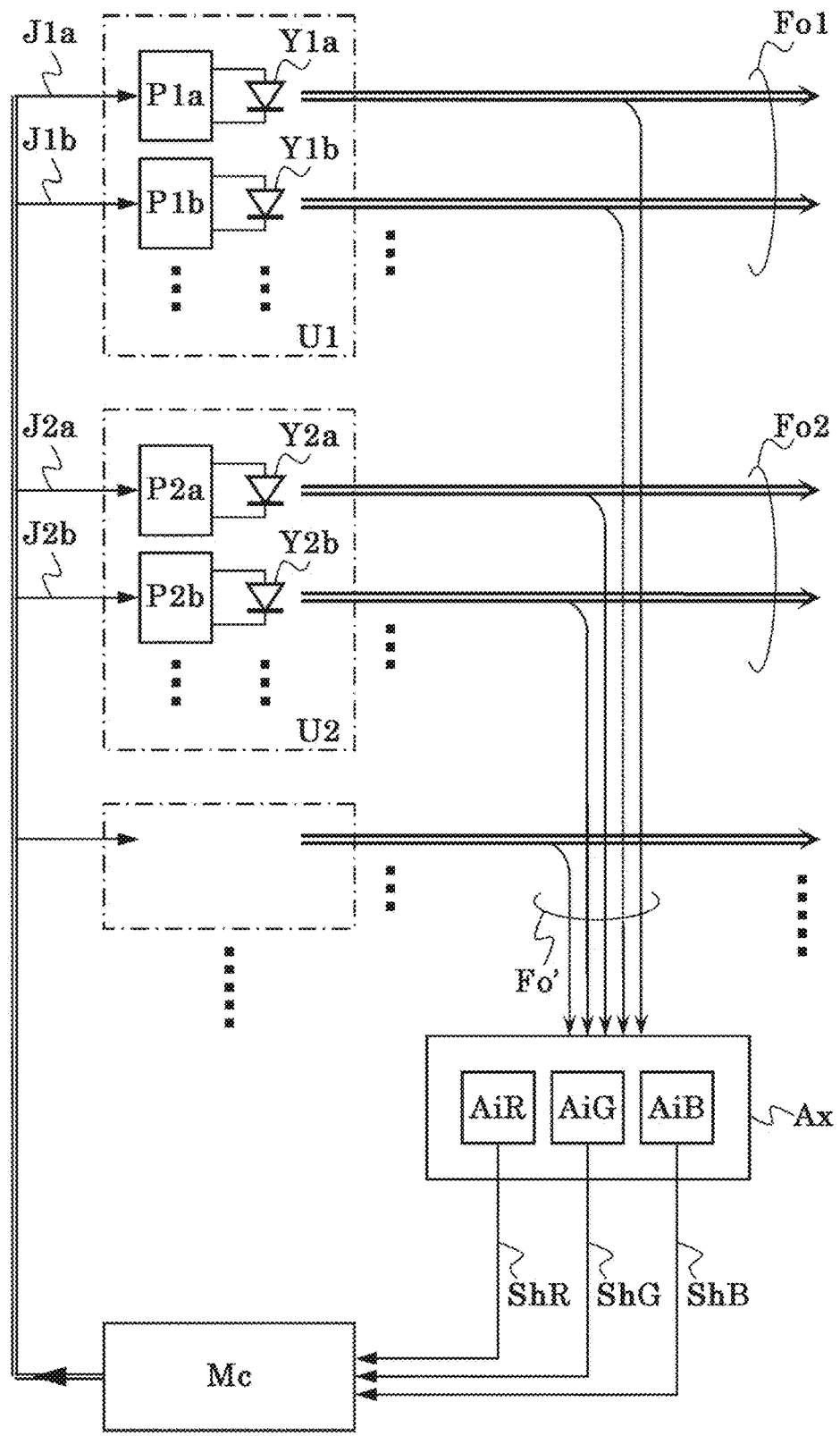
FIG. 1 is a block diagram illustrating a light source unit according to an embodiment of the disclosure in a simplified manner.

Next, an embodiment of the disclosure is described with reference to FIG. 1 that is a block diagram illustrating a light source unit according to the embodiment of the disclosure in a simplified manner.

One or more light emitting elements ($Y1a$, $Y1b$, ...) provided in an elemental light source ($U1$) may be respectively driven by drive circuits ($P1a$, $P1b$, ...) and emit light.

Note that each of the light emitting elements ($Y1a$, $Y1b$, ...) may be a light source that converts, for example, a wavelength of a semiconductor laser or radiated light of a semiconductor laser with use of a non-linear optical phenomenon such as harmonic generation and optical parametric effect. A plurality of such light sources may be driven by the respective drive circuits ($P1a$, $P1b$, ...) through series coupling, parallel coupling, or series-parallel coupling.

Moreover, each of the drive circuits ($P1a$, $P1b$, ...) may be a DC/DC converter that is fed with power by a DC power source (not illustrated) and configured of, for example, a circuit such as a step-down chopper circuit or a step-up chopper circuit. The drive circuits ($P1a$, $P1b$, ...) may supply predetermined power to the respective light emitting elements ($Y1a$, $Y1b$, ...).

An integrated control circuit ($Mc$) may independently transmit and receive data to control the drive circuits ($P1a$, $P1b$, ..., $P2a$, $P2b$, ...) through respective drive circuit control signals ($J1a$, $J1b$, ..., $J2a$, $J2b$, ...), thereby supplying the predetermined power to the light emitting elements ($Y1a$, $Y1b$, ..., $Y2a$, $Y2b$, ...).

The light source unit according to the embodiment of the disclosure may include a plurality of elemental light sources similar to the above-described elemental light source ($U1$). The light emitting elements ($Y1a$, $Y1b$, ..., $Y2a$, $Y2b$, ...) included in the plurality of elemental light sources may include light emitting elements included in a plurality of kinds of narrow wavelength bands that are different in emission wavelength. The included wavelength bands may be three primary colors R, G, and B in this example.

Accordingly, to measure integral optical characteristics of output luminous fluxes ($Fo1$, $Fo2$, ...) of the respective elemental light sources ($U1$, $U2$, ...), measurement-use output luminous fluxes ($Fo'$) may be generated and may be allowed to enter band optical characteristic acquisition means (band optical characteristic acquisition sections; AiR, AiG, and AiB) that are provided for the respective wavelength bands. The measurement-use output luminous fluxes ($Fo'$) may be each formed of light of an amount correlated with a light amount of the output luminous fluxes ($Fo1$, $Fo2$, ...) that include a portion of the respective output luminous fluxes ($Fo1$, $Fo2$, ...) extracted and collected.

The integral optical characteristics indicate, assuming a state where all of the output luminous fluxes ($Fo1$, $Fo2$, ...) are mixed, characteristics to all of the output luminous fluxes ($Fo1$, $Fo2$, ...) such as content percentage of light for each of the wavelength bands and shade of light for each of the wavelength bands in all of the output luminous fluxes (Fo1, Fo2, . . . ). The reason for the assumption is because, for example, when the light source unit according to the embodiment of the disclosure is applied to a projector, the light of the wavelength bands R, G, and B are finally mixed after image information is added to the light of the wavelength bands R, G, and B for each of the wavelength bands through two-dimensional light intensity modulation, in a case where the output luminous fluxes (Fo1, Fo2, . . . ) are outputted by mixing the light of the wavelength bands R, G, and B and even in a case where the output luminous fluxes (Fo1, Fo2, . . . ) are outputted by separating the light of the wavelength bands R, G, and B.

Further, correlation with the light amount of the output luminous flux indicates that the light amount and shade for each wavelength band of the output luminous fluxes (Fo1, Fo2, . . . ) are estimatable through measurement of the measurement-use output luminous fluxes (Fo'). At this time, magnification of the correlation (a correlation coefficient) may be different among the wavelength bands because being correctable by previous measurement.

The band optical characteristic acquisition means (AiR, AiG, and AiB) may be to acquire light emitting intensity indicating values correlated with light intensity and wavelength deviation indicating values correlated with deviation from a reference wavelength. In the light source unit of the embodiment of the disclosure, the band optical characteristic measurement means having any configuration may be usable as long as the means is able to measure and acquire the values.

A bundle of the optical fluxes extracted from the output luminous fluxes (Fo1, Fo2, . . . ) for the respective wavelength band is described as the measurement-use output luminous flux (Fo') for convenience. In addition, the band optical characteristic acquisition means are collectively described as one band optical characteristic acquisition set (Ax) for convenience. The measurement-use output luminous fluxes for the respective wavelength bands may individually enter the corresponding band optical characteristic acquisition means (AiR, AiG, and AiB).

The integrated control circuit (Mc) may read out band optical characteristic acquisition data (ShR, ShG, and ShB) from the band optical characteristic acquisition means (AiR, AiG, and AiB). The band optical characteristic acquisition data (ShR, ShG, and ShB) may include information to acquire the light emitting intensity indicating values and the wavelength deviation indicating values.

For example, in the case of the above-described projector, the output luminous fluxes (Fo1, Fo2, . . . ) may be used to illuminate the two-dimensional optical amplitude modulator provided independently for each of colors R, G, and B and to perform color synthesis of modulated luminous fluxes of the three primary colors R, G, and B with use of a disposed dichroic mirror or a disposed dichroic prism. Alternatively, all of the output luminous fluxes (Fo1, Fo2, . . . ) may be mixed, and the mixed output luminous flux as white light may be used as alternate of light from the light source (SjA) that is configured of, for example, the above-described high-luminance discharge lamp.

Figure 2:
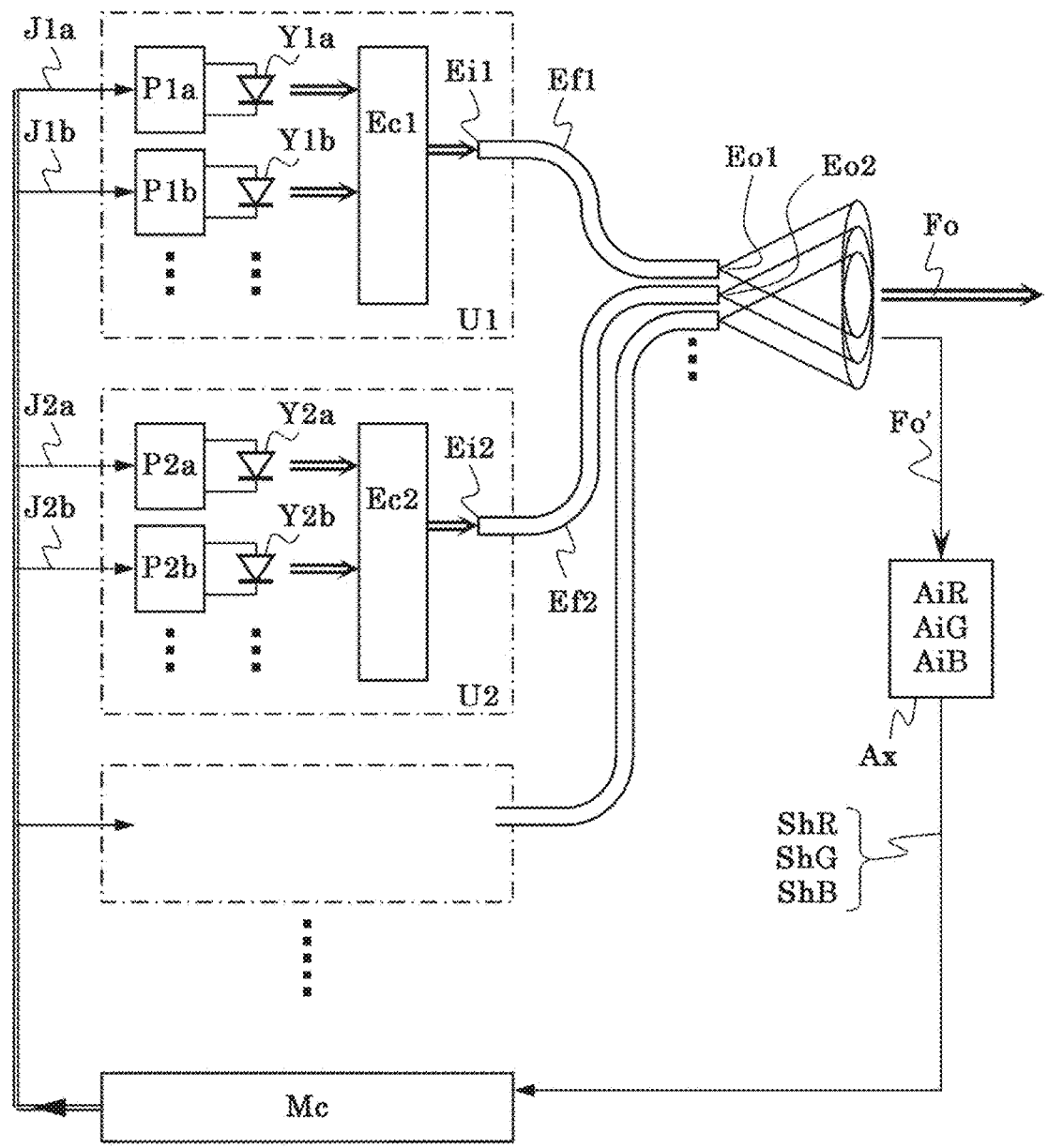
FIG. 2 is a block diagram illustrating a light source unit according to an embodiment of the disclosure in a simplified manner.

Alternatively, as illustrated in FIG. 2 that is a block diagram illustrating a light source unit according to an embodiment of the disclosure in a simplified manner, light emitted from the light emitting elements (Y1$a$, Y1$b$, . . . , Y2$a$, Y2$b$, . . . ) may be condensed on incident ends (Ei1, Ei2, . . . ) of respective optical fibers (Ef1, Ef2, . . . ) by condensing optical systems (Ec1, Ec2, . . . ), and condensed light propagates through cores of the respective optical fibers (Ef1, Ef2, . . . ) so as to be radiated from exit ends (Eo1, Eo2, . . . ). Each of the condensing optical systems (Ec1, Ec2, . . . ) may be configured of, for example, a lens.

The radiated light from the exit ends (Eo1, Eo2, . . . ) of the respective optical fibers (Ef1, Ef2, . . . ) of the respective elemental light sources (U1, U2, . . . ) may be collected, and the collected light may be outputted from the light source unit according to the embodiment of the disclosure, as a single output luminous flux (Fo).

To collect the radiated light from the plurality of exit ends (Eo1, Eo2, . . . ), exit end parts of the respective optical fibers (Ef1, Ef2, . . . ) may be so bundled as to align the exit ends (Eo1, Eo2, . . . ) to be positioned on the same plane, as the simplest way.

To measure the amount of light that is correlated with the light amount of the output luminous flux (Fo) and is guided by each of the optical fibers (Ef1, Ef2, . . . ), the measurement-use output luminous flux (Fo') that is formed by collecting extracted portions of the light radiated from the respective exit ends (Eo1, Eo2, . . . ) may be generated. Similarly to those in FIG. 1, the measurement-use output luminous flux (Fo') may enter the band optical characteristic acquisition means set (Ax) that is the group of the band optical characteristic acquisition means (AiR, AiG, and AiB).

Note that the case in which the exit end parts of all of the optical fibers (Ef1, Ef2, . . . ) are bundled to generate the output luminous flux (Fo) of white light is described here; however, the exit ends (Eo1, Eo2, . . . ) may be bundled separately for each of the wavelength bands R, G, and B to generate the output luminous fluxes of the respective wavelength bands, and the generated output luminous fluxes may individually enter the corresponding band optical characteristic acquisition means (AiR, AiG, and AiB).

Figure 3:
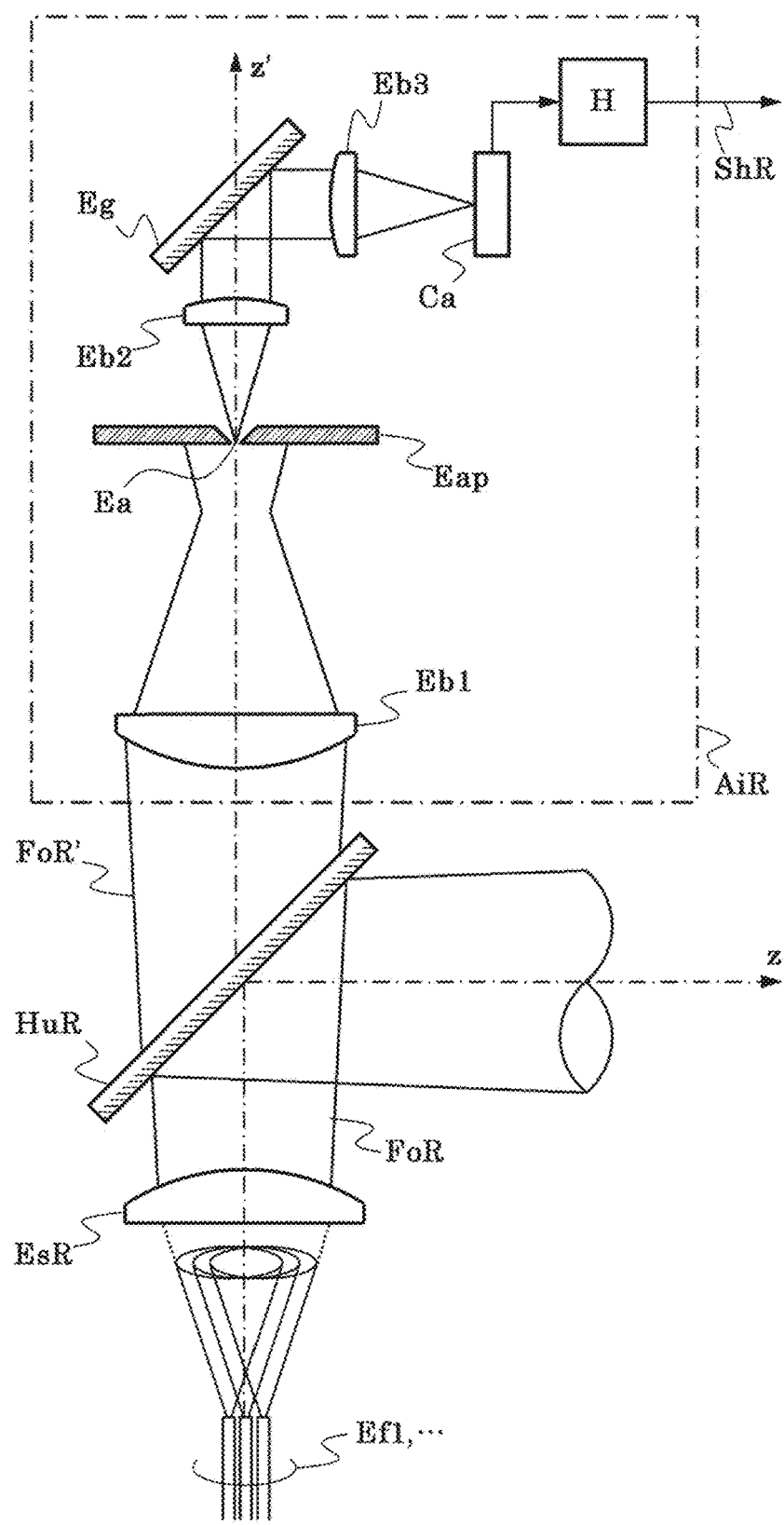
FIG. 3 is a schematic diagram illustrating a portion of the light source unit according to the embodiment of the disclosure in a simplified manner.

FIG. 3 illustrates an example of the configuration of the band optical characteristic acquisition means (AiR, AiG, and AiB). FIG. 3 is a schematic diagram illustrating a portion of the light source unit according to the embodiment of the disclosure in a simplified manner.

FIG. 3 illustrates the band optical characteristic acquisition means (AiR) that generates the band optical characteristic acquisition data (ShR) to acquire the light emitting intensity indicating value correlated with light intensity relating to the wavelength band of R color and the wavelength deviation indicating value correlated with deviation from the reference wavelength. The band optical characteristic acquisition means of the other colors also may have the similar configuration.

The light radiated from the exit ends of the respective optical fibers (Ef1, . . . ) may be converted into the output optical flux (FoR) of R color of the infinite image through the collimator lens (EsR). The output optical flux (FoR) may be reflected by a mirror (HuR) and the reflected optical flux may be guided in the z-axis direction.

On the other hand, a slight amount of transmitted light (FoR') may be leaked from the mirror (HuR) in the z'-axis direction. The transmitted light may be condensed by a condensing lens (Eb1) on a pinhole (Ea) of an opening plate (Eap), and the light that has passed through the pinhole (Ea) may be extracted to the rear side.

The luminous flux of the extracted light may be converted by a collimator lens (Eb2) into a luminous flux that forms an infinite image of the pinhole (Ea), and the luminous flux may be then reflected, as the measurement-use output luminous flux, by a wavelength dispersive optical element (Eg). The wavelength dispersive optical element (Eg) may use, for example, a diffraction grating and has a function of changing a traveling direction of the luminous flux in accordance with the wavelength of the light included in the luminous flux. The reflected luminous flux then may pass through an imaging lens (Eb3), which generates an image of the pinhole (Ea) that has been spectrally resolved, on an output image surface of the imaging lens (Eb3).

Further, disposing an imaging surface of an imaging element (Ca) on a position of the image makes it possible to image the image. The imaging element (Ca) may be configured of, for example, a one-dimensional image sensor.

At this time, an arrangement direction of pixels of the imaging element (Ca) may be made coincident with a projection direction of the exit light that has been varied in an angle depending on the wavelength variation of the light entering the wavelength dispersive optical element (Eg).

The above-described configuration makes it possible for a signal processing circuit (H) to read a distribution pattern of brightness of the pinhole image that has been spectrally resolved, and to calculate total brightness of all of the pixels to determine distribution pattern intensity. Further, the signal processing circuit (H) is able to calculate a centroid position of the pattern to determine a deviation amount from the pixel position corresponding to the reference wavelength, and generate the band optical characteristic acquisition data (ShR) that includes the distribution pattern intensity and the deviation amount.

However, when the spectral sensitivity characteristics of the imaging element (Ca) is not flat in the wavelength band, the brightness of each pixel may be desirably corrected depending on the position of each pixel before the calculation of the total brightness of all of the pixels and the calculation of the centroid position of the distribution pattern mentioned above.

For example, when the wavelength resolution power per pixel of the band optical characteristic acquisition means (AiR) that is determined from the characteristics of the wavelength dispersive optical element (Eg), the focal distance of the imaging lens (Eb), and the pixel pitch of the imaging element (Ca) may be 0.1 nm/pixel, and the gradient of the spectral sensitivity in the wavelength band (or the increase amount of sensitivity when the wavelength increases by 1 nm) may be 2%/nm, the measured brightness of the n-th pixel that is counted toward the longer wavelength side from the pixel corresponding to the reference wavelength, may be corrected such that the value obtained by multiplying the measured brightness by the correction coefficient Kn in the following expression, is regarded as true brightness of the n-th pixel.

$$Kn = 1 - 0.002 \cdot n$$

Incidentally, the n-th pixel that is counted toward the shorter wavelength side from the pixel corresponding to the reference wavelength may be corrected by the same expression while n is regarded as a negative value.

It is necessary to set the position of the pinhole (Ea) in the z'-axis direction to the position where the light radiated from all of the optical fibers (Ef1, . . . ) are superposed, in order to allow the signal processing circuit (H) to determine the above-described distribution pattern intensity and the above-described deviation amount of the collected light of all of the optical fibers (Ef1, . . . ) relating to the wavelength band.

To do that, the pinhole (Ea) may be desirably provided at a center of an exit pupil of the condensing lens (Eb1) while an entrance pupil of the condensing lens (Eb1) is regarded to position at infinity because a central axis of angle distribution of the radiated light from each point of the core at the exit ends of the respective optical fibers (Ef1, . . . ), namely, a principle ray is parallel to central axes of the cores of the respective optical fibers (Ef1, . . . ), namely, to the z'-axis.

The integrated control circuit (Mc) may receive the band optical characteristic acquisition data (ShR, ShG, and ShB) from the respective band optical characteristic acquisition means (AiR, AiG, and AiB) to acquire the distribution pattern intensity and the deviation amount for the respective wavelength bands R, G, and B.

Accordingly, the integrated control circuit (Mc) may calculate the light emitting intensity indicating values Sr, Sg, and Sb correlated with the light intensity, from the distribution pattern intensity, for the respective wavelength bands R, G, and B, and calculate the wavelength deviation indicating values $\Delta\lambda r$, $\Delta\lambda g$, and $\Delta\lambda b$ correlated with deviation from the reference wavelength, from the deviation amount of the centroid position of the distribution pattern from the pixel position corresponding to the reference wavelength, for the respective wavelength bands R, G, and B.

Typically, the color of light emitted from, for example, a light source is represented by chromaticity coordinate based on XYZ color system recommended by CIE (refer to The Japan Society of Applied Physics/The Optical Society of Japan, "Characteristics and Technologies of Color" of first edition (Oct. 10, 1986), published by Asakura Publishing Co., Ltd.).

The tristimulus values X, Y, and Z of the luminous flux to be measured represented by a spectrum $S(\lambda)$ having the wavelength $\lambda$ as a parameter may be determined by integration of the following expression (expression 1), with use of the color matching functions $xe(\lambda)$, $ye(\lambda)$, and $ze(\lambda)$ defined by CIE.

$$X = \int S(\lambda) \cdot xe(\lambda) \cdot d\lambda$$

$$Y = \int S(\lambda) \cdot ye(\lambda) \cdot d\lambda$$

$$Z = \int S(\lambda) \cdot ze(\lambda) \cdot d\lambda \qquad \text{Expression 1}$$

Incidentally, the integration may be performed in a region of wavelength from about 380 nm to about 780 nm.

With use of the tristimulus values X, Y, and Z, the chromaticity coordinates x and y of the luminous flux to be measured $S(\lambda)$ may be determined by the following expression (Expression 2).

$$x = X/[X+Y+Z]$$

$$y = Y/[X+Y+Z] \qquad \text{Expression 2}$$

Figure 4A:
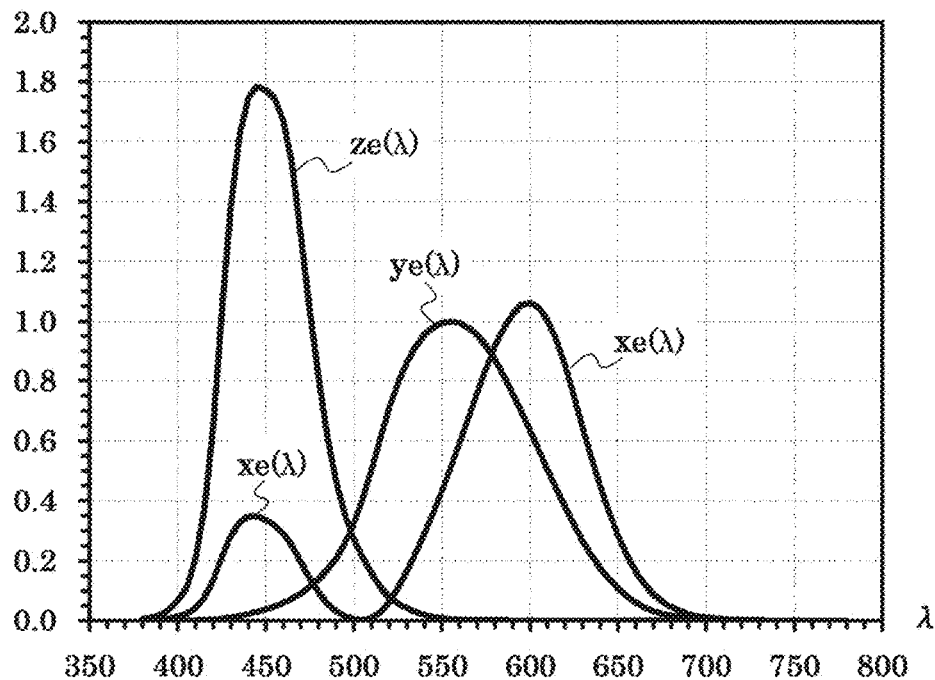
FIGS. 4A and 4B are outline diagrams of concept relating to the technology of the light source unit according to the embodiment of the disclosure.

Note that the color matching functions $xe(\lambda)$, $ye(\lambda)$, and $ze(\lambda)$ may have the characteristics illustrated in FIG. 4A that is an outline diagram of concept relating to the technology of the light source unit according to the embodiment of the disclosure.

Incidentally, although symbols of characters x, y, and z attached with upper horizontal line are used in the color matching function in general documents, the symbols of the color matching functions in the present specification are denoted as described above for certain reasons.

Here, to help understanding of the light source unit according to the embodiment of the disclosure, a virtual integrated control circuit that is similar to the integrated control circuit (Mc) but is different in a configuration achieving calculation of the variation of the light emitting intensity indicating value for the feedback control from the integrated control circuit (Mc), is considered. For the time being in the following description, description is given of a virtual light source unit that has the configuration same as that of the light source unit according to the embodiment of the disclosure except for the above-described virtual integrated control circuit that is provided in place of the integrated control circuit (Mc).

The virtual integrated control circuit may have local band color matching function information. The local band color matching function information may include function values of color matching functions xe($\lambda$), ye($\lambda$), and ze($\lambda$) at the reference wavelength and information relating to variation of the functional values of the color matching functions when the wavelength is varied from the reference wavelength (for example, a variation rate of the function against wavelength variation described later), for each of the wavelength bands R, G, and B.

Accordingly, as described later, the virtual integrated control circuit may use the local band color matching function information to approximately calculate the tristimulus values X, Y, and Z or the chromaticity coordinates x and y as color phase indicating values, on the basis of the light emitting intensity indicating values and the wavelength deviation indicating values that are calculated for the respective wavelength bands R, G, and B.

Figure 4B:
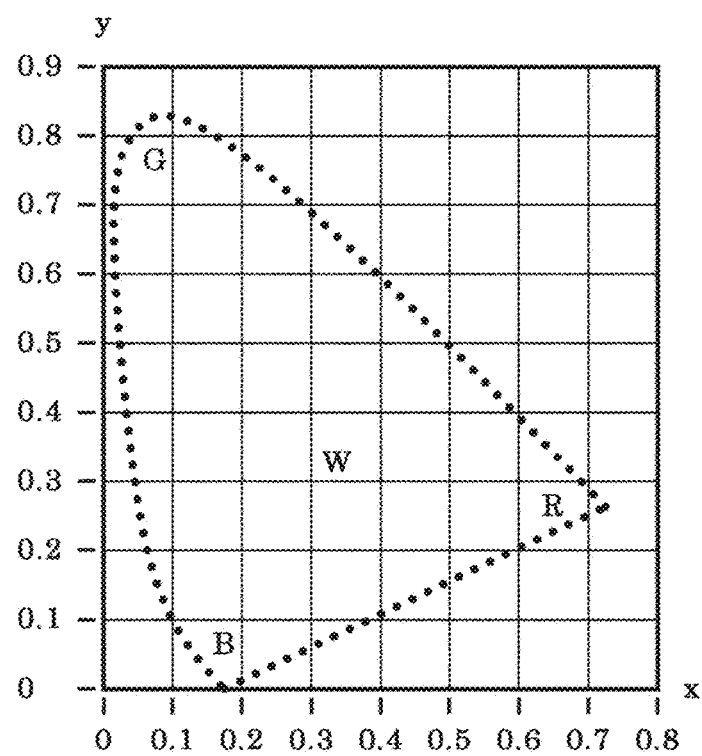

FIG. 4B is an outline diagram illustrating so-called chromaticity diagram that shows relationship between chromaticity coordinates and colors. All of colors representable in the color system are located on or inside a dashed line in the figure, and outline positions of red (R), green (G), blue (B), and white (W) are illustrated.

Note that single-color light such as a laser beam is located on the dashed line in the figure except for a straight line from R to B that is so-called pure purples.

The chromaticity coordinates of pure white are ⅓ and ⅓.

The chromaticity coordinates corresponding to pure white is not necessarily favorable as the target chromaticity coordinates.

This is because, for example, when the light source unit according to the embodiment of the disclosure is applied to a projector, usage efficiency of light of an optical system in the projector is not necessarily the same in colors R, G, and B.

For example, if the usage efficiency of B color is low in the optical system in a projector, the target chromaticity coordinates may become bluish chromaticity coordinates including extra B-color component.

Accordingly, the target chromaticity coordinates may be determined not on the basis of the color of the output luminous fluxes (Fo, Fo1, Fo2, ...) of the light source unit but on the basis of the output of an apparatus that uses the light source unit.

To maintain the target color phase that is the issue of the disclosure, it is necessary for the virtual integrated control circuit to acquire the light emitting intensity indicating values Sr, Sg, and Sb correlated with the light intensity and the wavelength deviation indicating values $\Delta\lambda r$, $\Delta\lambda g$, and $\Delta\lambda b$ correlated with deviation from the reference wavelength to calculate the chromaticity coordinates x and y as the color phase indicating values. In addition, it is necessary for the virtual integrated control circuit to compare the color phase indicating values with the respective target values to appropriately increase or decrease the total output power Pr, Pg, and Pb of drive circuits that respectively drive the corresponding light emitting elements of the wavelength bands R, G, and B out of the drive circuits (P1a, P1b, ..., P2a, P2b, ...), to adjust white balance in a feedback manner.

The method of calculating the increase and decrease amount of the output power to efficiently perform the adjustment sequence is described later.

The above-described XYZ color system recommended by CIE is configured such that the value Y in the expression 1 indicates the total brightness of light of all of the included wavelength bands.

Accordingly, when the total brightness of light of all of the wavelength bands R, G, and B is also stabilized in addition to the color phase indicating values correlated with the color of light, the virtual integrated control circuit compares the calculated value Y as the brightness indicating value with the target value. When the value Y is larger than (or smaller than) the target value, the virtual integrated control circuit decreases (or increases), out of the drive circuits (P1a, P1b, ..., P2a, P2b, ...), the total output power Pr of the drive circuits driving the light emitting elements of the R wavelength band, the total output power Pg of the drive circuits driving the light emitting elements of the G wavelength band, and the total output power Pb of the drive circuits driving the light emitting elements of the B wavelength band, at the same rate through the drive circuit control signals (J1a, J1b, ..., J2a, J2b, ...), on the premise of a law of electric power proportional to light amount described later. As a result, it is possible for the virtual integrated control circuit to adjust the brightness of light without changing the color of light, through the feedback control that is performed in a direction in which the difference between the brightness of light and the target brightness becomes small.

The method of calculating the increase and decrease amount of the output power to efficiently perform the adjustment sequence is described later.

Before the description of the increase and decrease of the output power to maintain the chromaticity coordinates x and y as the color phase indicating values and the brightness indicating value Y at the respective target values, the matter relating to the relationship between the output power of the drive circuits that drive the light emitting elements of one wavelength band and the light intensity of the component of the wavelength band is described first.

Note that the relationship is common to the integrated control circuit (Mc) and the virtual integrated control circuit.

The embodiment of the disclosure uses property in which the total output power of the drive circuits driving the light emitting elements of one wavelength band is substantially proportionally correlated with the light intensity of the component of the wavelength band. The property is referred to as the law of electric power proportional to light amount. More specifically, out of the drive circuits (P1a, P1b, ..., P2a, P2b, ...), the total output power Pr of the drive circuits driving the light emitting elements of the R wavelength band, the total output power Pg of the drive circuits driving the light emitting elements of the G wavelength band, and the total output power Pb of the drive circuits driving the light emitting elements of the B wavelength band are substantially proportionally correlated with the light intensity of the components of the wavelength bands R, G, and B, respectively. As the precondition thereof, it is assumed that all of the light emitting elements emitting light of the same color emit light with the same light emitting efficiency (more specifically, the light emitting elements are of the same type available from the same manufacturer), though the light emitting efficiency may be different among the light emitting element emitting light of different colors.

If the above-described precondition is not established due to the fact that a plurality of light emitting elements that emit light of the same color and are different in light emitting efficiency are mixed, for example, it is assumed that there are light emitting elements of a type A that are high in light emitting efficiency and light emitting elements of a type B that are lower in light emitting efficiency by 10% than the light emitting elements of the type A. When receiving power setting instruction from the integrated control circuit (Mc) (or the virtual integrated control circuit) through the drive circuit control signals (J1a, J1b, . . . , J2a, J2b, . . . ), the drive circuits driving the light emitting elements of the type B internally set the power larger by 10% than the instructed setting power, or performs other configurational improvement, thereby easily addressing such a case.

Note that proportional accuracy or linearity is not important in the law of electric power proportional to light amount.

This is because even if the increase of the power and the increase of the light amount are not in the linear relationship, gradually varying the power makes it possible to gradually change the system state toward the target values by the feedback control as long as the increase of the power is correlated with the increase of the light amount.

Moreover, when the total output power of the drive circuits driving the light emitting element of one wavelength band is varied, in the case in which a plurality of target drive circuits are present, the output power of all of the drive circuits may be varied at the same rate or different rates, or the output power of only specific drive circuit may be varied. Any variation may be adopted.

The fineness of power setting to the drive circuit may be finite, for example, 256 gradations when the setting data length is 8 bits.

Therefore, when the power is increased by the minimum unit, for example, the power setting of all of the drive circuits is not collectively increased by 1 LSB, but the power setting of the first drive circuit may be increased by 1 LSB, and then the power setting of the second drive circuit may be increased by 1 LSB, and the power setting of other drive circuits is individually continued in this manner. When the power setting of the final drive circuit is increased by 1 LSB, the power setting of the first drive circuit is then increased again by 1 LSB. This advantageously may increase the number of gradations of the power setting to the times of the number of drive circuits.

As mentioned above, the integrated control circuit (Mc) (and the virtual integrated control circuit) measures the light emitting intensity indicating values correlated with the light intensity, on the basis of the band optical characteristic acquisition data (ShR, ShG, and ShB) from the band optical characteristic acquisition means (AiR, AiG, and AiB).

Here, the light intensity is correlated with the optical power of all of the light emitting elements belonging to one wavelength bands, out of the light emitting elements (Y1A, Y1b, . . . , Y2a, Y2b, . . . ), and has no relation to the visibility of human beings.

In contrast, the brightness of light is the brightness sensed by human beings. Therefore, the intensity is varied by influence of the visibility of human beings as the wavelength varies even if the optical power (density) is the same.

On the premise of the law of electric power proportional to light amount, it may be considered that the light emitting intensity indicating values of the respective wavelength bands R, G, and B are respectively correlated independently with the total output power Pr of the drive circuits driving the light emitting elements of the R wavelength band, the total output power Pg of the drive circuits driving the light emitting elements of the G wavelength band, and the total output power Pb of the drive circuits driving the light emitting elements of the B wavelength band, out of the drive circuits (P1a, P1b, . . . , P2a, P2b, . . . ).

For example, in the case in which the light emitting intensity indicating values of the respective wavelength bands R, G, and B are all increased by 1%, when the total output power of the wavelength bands R, G, and B are respectively 200 W, 300 W, and 100 W, it is sufficient to increase the total output power of the wavelength bands R, G, and B respectively to 202 W, 303 W, and 101 W.

Out of the drive circuits (P1a, P1b, . . . , P2a, P2b, . . . ) described for the law of electric power proportional to light amount, the total output power Pr of the drive circuits driving the light emitting elements of the R wavelength band, the total output power Pg of the drive circuits driving the light emitting elements of the G wavelength band, and the total output power Pb of the drive circuits driving the light emitting elements of the B wavelength band are represented by the following expressions (expression 3). The expressions are represented by independent proportionality coefficients kr, kg, and kb and the target values Srp, Sgp, and Sbp of the light emitting intensity indicating values Sr, Sg, and Sb of the respective wavelength bands R, G, and B.

$$Pr = kr \cdot Srp$$

$$Pg = kg \cdot Sgp$$

$$Pb = kb \cdot Sbp \qquad \text{Expression 3}$$

It is possible to determine the proportionality coefficients kr, kg, and kb of the above-described expression 3 from the ratio of the above-described total output power Pr, Pg, and Pb and the light emitting intensity indicating values Sr, Sg, and Sb that are acquired on the basis of the band optical characteristic acquisition data (ShR, ShG, and ShB) acquired by the band optical characteristic acquisition means (AiR, AiG, and AiB).

First, it is assumed that safe initial values that are unspecified but appropriately determined are set to the proportionality coefficients kr, kg, and kb. The total output power Pr, Pg, and Pb that may cause safe initial target values Srp, Sgp, Sbp appropriately determined with respect to the light emitting intensity indicating values Sr, Sg, and Sb are tentatively determined by the expression 3, on the basis of the unspecified proportionality coefficients kr, kg, and kb.

The proportionality coefficients kr, kg, and kb may be corrected according to the following expressions (expression 4), with use of the ratio of the light emitting intensity indicating values Sr, Sg, and Sb that are acquired from the band optical characteristic acquisition means (AiR, AiG, and AiB) when the light emitting elements are actually driven with the power Pr, Pg, and Pr and the original target values Srp, Sgp, and Sbp.

$$kr \leftarrow kr \cdot Srp/Sr$$

$$kg \leftarrow kg \cdot Sgp/Sg$$

$$kb \leftarrow kb \cdot Sbp/Sb \qquad \text{Expression 4}$$

The left arrow ← indicates that calculation result on right side is assigned to the variable on left side.

This correction may be performed every time the slight variation $\Delta Sr$, $\Delta Sg$, and $\Delta Sb$ of the light emitting intensity indicating values Sr, Sg, and Sb are determined, the target values Srp, Sgp, and Sbp are updated according to the following expressions (expression 5), power is reset according to the above-described expression 3, and the band optical characteristic acquisition means (AiR, AiG, and AiB) perform measurement, in repeat of the feedback control loop as described above.

$$Srp = Sr + \Delta Sr$$

$$Sgp = Sg + \Delta Sg$$

$$Sbp = Sb + \Delta Sb \quad \text{Expression 5}$$

In this way, as mentioned above, even if the proportionality coefficients kr, kg, and kb are not true proportionality constants but are, for example, non-linear coefficients showing saturation tendency, correction is repeatedly performed with a mere ratio defined by the expression 3. Accordingly, correct correspondence between the total output power Pr, Pg, and Pb of the drive circuits of the wavelength bands R, G, and B and the light emitting intensity indicating values Sr, Sg, and Sb (and the target values Srp, Sgp, and Sbp) is maintained.

Subsequently, there is described a method of calculating the chromaticity coordinates x and y and the brightness of light Y with use of the light emitting intensity indicating values Sr, Sg, and Sb and the value of the deviations $\Delta\lambda r$, $\Delta\lambda g$, and $\Delta\lambda b$ from the reference wavelength serving as the wavelength deviation indicating values that are specifically determined. Further, there is described a method of determining the variations $\Delta Sr$, $\Delta Sg$, and $\Delta Sb$ when the light emitting intensity indicating values Sr, Sg, and Sb are slightly varied, in order to perform the feedback control such that the chromaticity coordinates x and y and the brightness of light Y are maintained at the target values thereof.

When the respective reference wavelengths are denoted by $\lambda ro$, $\lambda go$, and $\lambda bo$, the above-described expression 1 is rewritten to the following expressions (expression 6) that are actual form matched to the current case.

$$X = Sr \cdot xe(\lambda ro + \Delta\lambda r) + Sg \cdot xe(\lambda go + \Delta\lambda g) + Sb \cdot xe(\lambda bo + \Delta\lambda b)$$

$$Y = Sr \cdot ye(\lambda ro + \Delta\lambda r) + Sg \cdot ye(\lambda go + \Delta\lambda g) + Sb \cdot ye(\lambda bo + \Delta\lambda b)$$

$$Z = Sr \cdot ze(\lambda ro + \Delta\lambda r) + Sg \cdot ze(\lambda go + \Delta\lambda g) + Sb \cdot ze(\lambda bo + \Delta\lambda b) \quad \text{Expression 6}$$

To calculate the expressions, for example, the color matching function values at the discrete wavelength values that are appropriately selected near the reference wavelength for each of the wavelength bands may be held as information relating to variation of the functional values of the color matching function when the wavelength is varied from the reference wavelength, out of the local band color matching function information held by the virtual integrated control circuit. The functional values corresponding to the measured wavelength deviation indicating values may be determined with use of a correction method.

The variation of the wavelength of the light emitting elements (Y1a, Y1b, . . . , Y2a, Y2b, . . . ) caused by the temperature variation or other factors is about several nanometers, for example. Therefore, even if the calculation is performed while the function form of the color matching function near the reference wavelength is approximated to a linear form, sufficient accuracy in practice is obtainable.

Accordingly, in the following, the description is given on the assumption that the variation rates of the function with respect to the wavelength variation, namely, the gradients of the variation of the functional values when the wavelength is varied are held as the information relating to variation of the functional values of the color matching function when the wavelength is varied from the reference wavelength.

Typically, variation $\Delta f$ of the function $f = f(\lambda)$ when the variable $\lambda$ of the function is slightly varied by $\Delta\lambda$ is approximated by the following expression (expression 7) with use of a derivative $df/d\lambda$ of the function f.

$$\Delta f = (df/d\lambda) \cdot \Delta\lambda \quad \text{Expression 7}$$

The following expressions (expression 8) are obtained by applying the expression to the color matching functions $xe(\lambda)$, $ye(\lambda)$, and $ze(\lambda)$. At this time, the wavelength $\lambda$ near $\lambda ro$ is represented by $\lambda = \lambda ro + \Delta\lambda r$.

$$xe(\lambda) = xe(\lambda ro + \Delta\lambda r) = xe(\lambda ro) + Fxro \cdot \Delta\lambda r$$

$$ye(\lambda) = ye(\lambda ro + \Delta\lambda r) = ye(\lambda ro) + Fyro \cdot \Delta\lambda r$$

$$ze(\lambda) = ze(\lambda ro + \Delta\lambda r) = ze(\lambda ro) + Fzro \cdot \Delta\lambda r$$

where $$Fxro = dxe/d\lambda(\lambda = \lambda ro)$$

$$Fyro = dye/d\lambda(\lambda = \lambda ro)$$

$$Fzro = dze/d\lambda(\lambda = \lambda ro) \quad \text{Expression 8}$$

Likewise, when the wavelength $\lambda$ near $\lambda go$ is represented by $\lambda = \lambda go + \Delta\lambda g$, the following expressions (expression 9) are obtained.

$$xe(\lambda) = xe(\lambda go + \Delta\lambda g) = xe(\lambda go) + Fxgo \cdot \Delta\lambda g$$

$$ye(\lambda) = ye(\lambda go + \Delta\lambda g) = ye(\lambda go) + Fygo \cdot \Delta\lambda g$$

$$ze(\lambda) = ze(\lambda go + \Delta\lambda g) = ze(\lambda go) + Fzgo \cdot \Delta\lambda g$$

where $$Fxgo = dxe/d\lambda(\lambda = \lambda go)$$

$$Fygo = dye/d\lambda(\lambda = \lambda go)$$

$$Fzgo = dze/d\lambda(\lambda = \lambda go) \quad \text{Expression 9}$$

Further, when the wavelength $\lambda$ near $\lambda bo$ is represented by $\lambda = \lambda bo + \Delta\lambda b$, the following expressions (expression 10) are obtained.

$$xe(\lambda) = xe(\lambda bo + \Delta\lambda b) = xe(\lambda bo) + Fxbo \cdot \Delta\lambda b$$

$$ye(\lambda) = ye(\lambda bo + \Delta\lambda b) = ye(\lambda bo) + Fybo \cdot \Delta\lambda b$$

$$ze(\lambda) = ze(\lambda bo + \Delta\lambda b) = ze(\lambda bo) + Fzbo \cdot \Delta\lambda b$$

where $$Fxbo = dxe/d\lambda(\lambda = \lambda bo)$$

$$Fybo = dye/d\lambda(\lambda = \lambda bo)$$

$$Fzbo = dze/d\lambda(\lambda = \lambda bo) \quad \text{Expression 10}$$

At this time, when the luminous flux to be measured $S(\lambda)$ is approximated to be configured of three primary colors R, G, and B, the luminous flux to be measured $S(\lambda)$ is represented by the following expression (expression 11) with use of the delta function $\delta(\lambda)$.

$$Sr(\lambda) = Sr \cdot \delta(\lambda - \lambda ro - \Delta\lambda r)$$

$$+ Sg \cdot \delta(\lambda - \lambda go - \Delta\lambda g)$$

$$+ Sb \cdot \delta(\lambda - \lambda bo - \Delta\lambda b) \quad \text{Expression 11}$$

Applying this expression and the above-described expressions 8, 9, and 10 to the integration of the above-described expression 1 results in the following expression (expression 12) relating to the tristimulus value X.

$$X = Sr \cdot [xe(\lambda ro) + Fxro \cdot \Delta\lambda r]$$

$$+ Sg \cdot [xe(\lambda go) + Fxgo \cdot \Delta\lambda g]$$

$$+Sb \cdot [xe(\lambda bo) + Fxbo \cdot \Delta\lambda b]$$

$$= Hxr \cdot Sr + Hxg \cdot Sg + Hxb \cdot Sb$$

where $$Hxr = xe(\lambda ro) + Fxro \cdot \Delta\lambda r = Hxro + Fxro \cdot \Delta\lambda r$$

$$Hxg = xe(\lambda go) + Fxgo \cdot \Delta\lambda g = Hxgo + Fxgo \cdot \Delta\lambda g$$

$$Hxb = xe(\lambda bo) + Fxbo \cdot \Delta\lambda b = Hxbo + Fxbo \cdot \Delta\lambda b \quad \text{Expression 12}$$

In addition, the following expression (expression 13) relating to the tristimulus value Y is obtained.

$$Y = Sr \cdot [ye(\lambda ro) + Fyro \cdot \Delta\lambda r]$$

$$+ Sg \cdot [ye(\lambda go) + Fygo \cdot \Delta\lambda g]$$

$$+ Sb \cdot [ye(\lambda bo) + Fybo \cdot \Delta\lambda b]$$

$$= Hyr \cdot Sr + Hyg \cdot Sg + Hyb \cdot Sb$$

where $$Hyr = ye(\lambda ro) + Fyro \cdot \Delta\lambda r = Hyro + Fyro \cdot \Delta\lambda r$$

$$Hyg = ye(\lambda go) + Fygo \cdot \Delta\lambda g = Hygo + Fygo \cdot \Delta\lambda g$$

$$Hyb = ye(\lambda bo) + Fybo \cdot \Delta\lambda b = Hybo + Fybo \cdot \Delta\lambda b \quad \text{Expression 13}$$

Further, the following expression (expression 14) relating to the tristimulus value Z is obtained.

$$Z = Sr \cdot [ze(\lambda ro) + Fzro \cdot \Delta\lambda r]$$

$$+ Sg \cdot [ze(\lambda go) + Fzgo \cdot \Delta\lambda g]$$

$$+ Sb \cdot [ze(\lambda bo) + Fzbo \cdot \Delta\lambda b]$$

$$= Hzr \cdot Sr + Hzg \cdot Sg + Hzb \cdot Sb$$

where $$Hzr = ze(\lambda ro) + Fzro \cdot \Delta\lambda r = Hzro + Fzro \cdot \Delta\lambda r$$

$$Hzg = ze(\lambda go) + Fzgo \cdot \Delta\lambda g = Hzgo + Fzgo \cdot \Delta\lambda g$$

$$Hzb = ze(\lambda bo) + Fzbo \cdot \Delta\lambda b = Hzbo + Fzbo \cdot \Delta\lambda b \quad \text{Expression 14}$$

Note that in the expressions 12, 13, and 14, the expressions using the coefficients Hxr, Hxg, Hxb, Hyr, Hyg, Hyb, Hzr, Hzg, and Hzb that are defined by the following expressions (expression 15) are described together for simplification of expression.

$$Hxro = xe(\lambda ro)$$

$$Hxgo = xe(\lambda go)$$

$$Hxbo = xe(\lambda bo)$$

$$Hyro = ye(\lambda ro)$$

$$Hygo = ye(\lambda go)$$

$$Hybo = ye(\lambda bo)$$

$$Hzro = ze(\lambda ro)$$

$$Hzgo = ze(\lambda go)$$

$$Hzbo = ze(\lambda bo) \quad \text{Expression 15}$$

The variations $\Delta X$, $\Delta Y$, and $\Delta Z$ of the tristimulus values X, Y, and Z when the light emitting intensity indicating values Sr, Sg, and Sb are slightly varied are represented by the following expressions (expression 16) based on the above-described expressions 12, 13, and 14.

$$\Delta X = Hxr \cdot \Delta Sr + Hxg \cdot \Delta Sg + Hxb \cdot \Delta Sb$$

$$\Delta Y = Hyr \cdot \Delta Sr + Hyg \cdot \Delta Sg + Hyb \cdot \Delta Sb$$

$$\Delta Z = Hzr \cdot \Delta Sr + Hzg \cdot \Delta Sg + Hzb \cdot \Delta Sb \quad \text{Expression 16}$$

In this way, the variation of the color phase indicating values when the light emitting intensity indicating values for the respective wavelength bands are slightly varied are represented by the linear operation with use of the variation of the light emitting intensity indicating values. In addition, the coefficients at that time are determined with use of the light emitting intensity indicating values and the wavelength deviation indicating values for the respective wavelength bands.

In the feedback control performed by the virtual integrated control circuit, when considering that the slight variations $\Delta Sr$, $\Delta Sg$, and $\Delta Sb$ are added to the light emitting intensity indicating values Sr, Sg, and Sb in order to bring the current tristimulus values X, Y, and Z closer to the respective target values Xp, Yp, and Zp, the values $\Delta X$, $\Delta Y$, and $\Delta Z$ are determined by the following expressions (expression 17).

$$\Delta X = D \cdot [Xp - X]$$

$$\Delta Y = D \cdot [Yp - Y]$$

$$\Delta Z = D \cdot [Zp - Z] \quad \text{Expression 17}$$

Where, a dumping coefficient D is from 0 to 1. As a result, the above-described expression 16 is regarded as an elemental simultaneous linear equation with three unknowns relating to the slight variation $\Delta Sr$, $\Delta Sg$, and $\Delta Sb$. Since all of the coefficients thereof have been determined, the expression 16 is easily solved to determine the slight variations $\Delta Sr$, $\Delta Sg$, and $\Delta Sb$ of the light emitting intensity indicating values.

According to the above-described expression 5, the determined slight variations $\Delta Sr$, $\Delta Sg$, and $\Delta Sb$ are added to the original light emitting intensity indicating values Sr, Sg, and Sb to calculate new target values Srp, Sgp, and Sbp of the light emitting intensity indicating values. Then, the total output power Pr, Pg, and Pb of the drive circuits (P1a, P1b, . . . , P2a, P2b, . . . ) are updated through the above-described expression 3.

In the case in which one of the light emitting intensity indicating values Sr, Sg, and Sb, for example, Sr is determined separately for any reason (for example, in a case of reaching rating), the target values Xp, Yp, and Zp of the tristimulus values are not satisfied. It is necessary to change control system so that the color of light is maintained at a target color while giving up maintaining the brightness of light.

In a case of a method of performing control such that the above-described tristimulus values X, Y, and Z are maintained at the target values Xp, Yp, and Zp, for example, when the brightness of light is reduced such that the light emitting intensity indicating value Sr becomes a predetermined value while maintaining the target color of light, the target values Xp, Yp, and Zp of the tristimulus values are tentatively reduced at the same rate appropriately determined, and the feedback loop is actually performed through trial and error until an appropriate rate allowing the light emitting intensity indicating value Sr to be the predetermined value is found.

In contrast, when the chromaticity coordinates x and y that are the color phase indicating values correlated with the color of light and the value Y that is the brightness indicating value correlated with the brightness of light are target of control, and if the control system of maintaining the values x, y, and Y at the target values xp, yp, and Yp is achieved, for example, it becomes possible for the virtual integrated control circuit to perform the feedback control to maintain only the chromaticity coordinates x and y at the target values while the value Sr is fixed.

A case in which the control targets are the values x, y, and Y and control is performed such that the values x, y, and Y are maintained at the target values xp, yp, and Yp is described below.

When the above-described expressions 12, 13, and 14 relating to the tristimulus values X, Y, and Z are applied in order to calculate the chromaticity coordinates x and y, the following expression (expression 18) relating to a sum of the tristimulus values X, Y, and Z is further obtained.

$$T=X+Y+Z$$

$$=[Hxr+Hyr+Hzr]\cdot Sr$$

$$+[Hxg+Hyg+Hzg]\cdot Sg$$

$$+[Hxb+Hyb+Hzb]\cdot Sb$$

$$=Ir\cdot Sr+Ig\cdot Sg+Ib\cdot Sb$$

where $$Ir=Hxr+Hyr+Hzr$$

$$Ig=Hxg+Hyg+Hzg$$

$$Ib=Hxb+Hyb+Hzb \quad \text{Expression 18}$$

Accordingly, the chromaticity coordinates x and y in the above-described expression 2 relating to the luminous flux to be measured $S(\lambda)$ are calculated by the following expressions (expression 19) using the above-described expressions 12, 13, and 14.

$$x=X/T$$

$$y=Y/T \quad \text{Expression 19}$$

Typically, variation in the function f=f(u, v, w) when variables u, v, and w of the function f are slightly varied is approximated to the following expression (expression 20) with use of partial derivatives $\delta f/\delta u$, $\delta f/\delta v$, and $\delta f/\delta w$ of the function f.

$$\Delta f=(\delta f/\delta u)\cdot \Delta u+(\delta f/\delta v)\cdot \Delta v+(\delta f/\delta w)\cdot \Delta w \quad \text{Expression 20}$$

When the chromaticity coordinates x and y and the brightness of light Y are regarded as functions including the light emitting intensity indicating values Sr, Sg, and Sb as variables, the values of the partial derivatives are specifically determined as the following expressions (expression 21).

$$Jxr=\delta x/\delta Sr=[\delta X/\delta Sr\cdot T-X\cdot \delta T/\delta Sr]/[T\cdot T]$$

$$=[Hxr\cdot T-Ir\cdot X]/[T\cdot T]$$

$$=[Hxr-Ir\cdot x]/T$$

$$Jxg=\delta x/\delta Sg=[Hxg-Ig\cdot x]/T$$

$$Jxb=\delta x/\delta Sb=[Hxb-Ib\cdot x]/T$$

$$Jyr=\delta y/\delta Sr=[Hyr-Ir\cdot y]/T$$

$$Jyg=\delta y/\delta Sg=[Hyg-Ig\cdot y]/T$$

$$Jyb=\delta y/\delta Sb=[Hyb-Ib\cdot y]/T \quad \text{Expression 21}$$

Accordingly, the variations of the chromaticity coordinates x and y and the brightness of light Y when the light emitting intensity indicating values Sr, Sg, and Sb are slightly varied are represented by the following expressions (expression 22).

$$\Delta x=Jxr\cdot \Delta Sr+Jxg\cdot \Delta Sg+Jxb\cdot \Delta Sb$$

$$\Delta y=Jyr\cdot \Delta Sr+Jyg\cdot \Delta Sg+Jyb\cdot \Delta Sb$$

$$\Delta Y=Hyr\cdot \Delta Sr+Hyg\cdot \Delta Sg+Hyb\cdot \Delta Sb \quad \text{Expression 22}$$

In this way, the variations of the color phase indicating values when the light emitting intensity indicating values are slightly varied for the respective wavelength bands are represented by linear operation with use of the variations of the light emitting intensity indicating values. In addition, the coefficients at that time are determined with use of the light emitting intensity indicating values and the wavelength deviation indicating values for the respective wavelength bands.

Incidentally, the third expression (relating to the variation ΔY) in the expression 22 is based on the following relationship obtained from the expression 13.

$$\delta Y/\delta Sr=Hyr$$

$$\delta Y/\delta Sg=Hyg$$

$$\delta Y/\delta Sb=Hyb$$

As described regarding the expression 17, it is considered that the light emitting intensity indicating values Sr, Sg, and Sb are slightly varied in order to bring the current values x, y, and Y close to the target values xp, yp, and Yp in the feedback control by the virtual integrated control circuit. When the dumping coefficient D is within a range of 0 to 1, the variations Δx, Δy, and ΔY are determined by the following expressions (expression 23).

$$\Delta x=D\cdot [xp-x]$$

$$\Delta y=D\cdot [yp-y]$$

$$\Delta Y=D\cdot [Yp-Y] \quad \text{Expression 23}$$

As a result, the above-described expression 22 is regarded as an elemental simultaneous linear equation with three unknowns relating to the slight variations ΔSr, ΔSg, and ΔSb of the light emitting intensity indicating values. Since all of the coefficients have been determined, the equation is easily solved to determine the slight variations ΔSr, ΔSg, and ΔSb of the light emitting intensity indicating values.

When one of the light emitting intensity indicating values Sr, Sg, and Sb is determined separately, for example, when the light emitting intensity indicating value Sg and accordingly the slight variation ΔSg is determined separately for any reason (for example, in a case of reaching rating), the slight variation ΔSg may be regarded not as the unknown value, but as a constant in the expression 22, and the following expressions (expression 24) that are obtained by modifying the expression 22 may be applied.

$$\Delta x-Jxg\cdot \Delta Sg=Jxr\cdot \Delta Sr+Jxb\cdot \Delta Sb$$

$$\Delta y-Jyg\cdot \Delta Sg=Jyr\cdot \Delta Sr+Jyb\cdot \Delta Sb \quad \text{Expression 24}$$

The expression 24 is an elemental simultaneous linear equation with two unknowns, which is easily solved. Therefore, it is possible to determine the slight variations $\Delta Sg$ and $\Delta Sb$.

In such a case, however, the brightness of light Y is not maintained at the target value, but it is possible for the virtual integrated control circuit to perform the feedback control to maintain the chromaticity coordinates x and y at the target values.

As mentioned above, the deviations $\Delta\lambda r$, $\Delta\lambda g$, and $\Delta\lambda b$ from respective reference wavelengths are determined on the basis of the band color characteristic acquisition data (ShR, ShG, and ShB) that are acquired by the band color characteristic acquisition means (AiR, AiG, and AiB), and the chromaticity coordinates x and y at that time are calculated with use of the deviations.

In addition, there has been presented the calculation method using the determined values of the deviations $\Delta\lambda r$, $\Delta\lambda g$, and $\Delta\lambda b$ from the respective reference wavelengths in determination of the coefficients Hxr, Hxg, Hxb, Hyr, Hyg, Hyb, Hzr, Hzg, Hzb, Jxr, Jxg, Jxb, Jyr, Jyg, and Jyb of the expressions 16 and 22 that are linear equations for the feedback control by the virtual integrated control circuit.

However, it is possible to determine the coefficients by approximating all of the deviations $\Delta\lambda r$, $\Delta\lambda g$, and $\Delta\lambda b$ from the respective reference wavelengths to zero.

This is because, although accuracy of the calculation is deteriorated by the approximation, calculation of the coefficients is advantageously simplified.

The calculation method in the case in which the approximation is performed in such a manner is described below.

When the light emitting intensity indicating values under approximation in which the deviations from the reference wavelengths are approximated to zero are denoted by Sr, Sg, and Sb that are the same symbols in the case where approximation is not performed, the tristimulus values X, Y, and Z corresponding to the above-described expressions 12, 13, and 14 are represented by the following expressions (expression 25).

$$X = Hxro \cdot Sr + Hxgo \cdot Sg + Hxbo \cdot Sb$$

$$Y = Hyro \cdot Sr + Hygo \cdot Sg + Hybo \cdot Sb$$

$$Z = Hzro \cdot Sr + Hzgo \cdot Sg + Hzbo \cdot Sb \qquad \text{Expression 25}$$

As a result, the following expressions (expression 26) are obtained as the equations to be solved in the feedback control loop by the virtual integrated control circuit, in place of the above-described expression 16.

$$\Delta X = Hxro \cdot \Delta Sr + Hxgo \cdot \Delta Sg + Hxbo \cdot \Delta Sb$$

$$\Delta Y = Hyro \cdot \Delta Sr + Hygo \cdot \Delta Sg + Hybo \cdot \Delta Sb$$

$$\Delta Z = Hzro \cdot \Delta Sr + Hzgo \cdot \Delta Sg + Hzbo \cdot \Delta Sb \qquad \text{Expression 26}$$

In this way, the variations of the color phase indicating values when the light emitting intensity indicating values for the respective wavelength bands are slightly varied are represented by the linear operation with use of the variations of the light emitting intensity indicating values, and the coefficients at that time are determined.

The values $\Delta X$, $\Delta Y$, and $\Delta Z$ on the left side of the expressions may be calculated with use of the above-described expression 17 based on the target values Xp, Yp, and Zp of the tristimulus values and the tristimulus values X, Y, and Z at that time.

The tristimulus values X, Y, and Z may be determined by the expressions 12, 13, and 14 after the light emitting intensity indicating values Sr, Sg, and Sb and the deviations $\Delta\lambda r$, $\Delta\lambda g$, and $\Delta\lambda b$ from the respective reference wavelengths serving as the wavelength deviation indicating values are determined, on the basis of the band optical characteristic acquisition data (ShR, ShG, and ShB) that are acquired by the band optical characteristic acquisition means (AiR, AiG, and AiB).

Likewise, when the deviations $\Delta\lambda r$, $\Delta\lambda g$, and $\Delta\lambda b$ from the respective reference wavelengths are each approximated to zero under the approximation in which the deviations from the respective reference wavelengths are each approximated to zero, Ir, Ig, and Ib of the expression 18 relating to the chromaticity coordinates x and y and expressions corresponding to the expression 21 are represented by the following expressions (expressions 27 and 28).

$$Iro = Hxro\ Hyro\ Hzro$$

$$Igo = Hxgo + Hygo + Hzgo$$

$$Ibo = Hxbo + Hybo + Hzbo \qquad \text{Expression 27}$$

$$Jxro = [Hxro - Iro \cdot x]/T$$

$$Jxgo = [Hxgo - Igo \cdot x]/T$$

$$Jxbo = [Hxbo - Ibo \cdot x]/T$$

$$Jyro = [Hyro - Iro \cdot y]/T$$

$$Jygo = [Hygo - Igo \cdot y]/T$$

$$Jybo = [Hybo - Ibo \cdot y]/T \qquad \text{Expression 28}$$

Incidentally, as mentioned above, the values x, y, and T may be calculated by applying the tristimulus values X, Y, and Z that are calculated by the expressions 12, 13, and 14 to the uppermost expression of the expression 18, namely, the following expression and to the expression 19, after the light emitting intensity indicating values Sr, Sg, and Sb and the deviations $\Delta\lambda r$, $\Delta\lambda g$, and $\Delta\lambda b$ from the respective reference wavelengths serving as the wavelength deviation indicating values are determined on the basis of the band optical characteristic acquisition data (ShR, ShG, and ShB) that are acquired by the band optical characteristic acquisition means (AiR, AiG, and AiB).

$$T = X + Y + Z \qquad \text{(redescribed)}$$

Then, the following expressions (expression 29) that are expressions to be solved in the feedback control loop by the virtual integrated control circuit, in place of the expression 27, are obtained.

$$\Delta x = Jxro \cdot \Delta Sr + Jxgo \cdot \Delta Sg + Jxbo \cdot \Delta Sb$$

$$\Delta y = Jyro \cdot \Delta Sr + Jygo \cdot \Delta Sg + Jybo \cdot \Delta Sb$$

$$\Delta Y = Hyro \cdot \Delta Sr + Hygo \cdot \Delta Sg + Hybo \cdot \Delta Sb \qquad \text{Expression 29}$$

In this way, the variations of the color phase indicating values when the light emitting intensity indicating values for the respective wavelength bands are slightly varied are represented by the linear operation with use of the variations of the light emitting intensity indicating values, and the coefficients at that time are determined.

The values $\Delta x$, $\Delta y$, and $\Delta Y$ on the left side of the expressions may be calculated by the expression 23, based on the target values xp, yp, and Yp of the chromaticity coordinates x and y and the brightness indicating value Y and the values x, y, and Y at that time.

Even when approximation in which the deviations from the reference wavelengths are each approximated to zero is performed, one of the light emitting intensity indicating values Sr, Sg, and Sb is eliminated from the expression 29, and the feedback control to maintain only the chromaticity coordinates x and y at the target values may be performed, by using the same method described with reference to the expression 24.

More specifically, for example, when the method is applied to the above-described expression 24 in which the slight variation ΔSg is separately determined, the following expressions (expression 30) are obtained.

$$\Delta x - Jxgo \cdot \Delta Sg = Jxro \cdot \Delta Sr + Jxbo \cdot \Delta Sb$$

$$\Delta y - Jygo \cdot \Delta Sg = Jyro \cdot \Delta Sr + Jybo \cdot \Delta Sb \quad \text{Expression 30}$$

Hereinbefore, for the color matching functions necessary for calculation of the chromaticity, the calculation method has been described on the precondition that the virtual integrated control circuit holds local band color matching function information, and calculates the color phase indicating values correlated with the chromaticity coordinates and determinates the slight variations ΔSr, ΔSg, and ΔSb of the light emitting intensity indicating values by solving the expression 16, 22, 25, or 29 that is a linear equation. The local band color matching function information includes functional values at least at the reference wavelength for the respective wavelength bands and the variation rate of the function against the wavelength variation, namely, the gradient of the variation of the functional value when the wavelength is varied. The color phase indicating value is calculated with use of the light emitting intensity indicating values for the respective wavelength bands, the wavelength deviation indicating values correlated with the deviations from the respective reference wavelengths, and the local band color matching function information.

In the case of an embedded microprocessor as with the light source unit according to the embodiment of the disclosure, however, the microprocessor having high performance as with one for the personal computer is not usable for numerical calculation, in particular, a floating-point operation in many cases.

Accordingly, unlike the virtual integrated control circuit, the processing to repeatedly resolve the simultaneous equations as mentioned above may easily cause overhead of the microprocessor in the feedback control loop by the integrated control circuit (Mc) of the light source unit according to the embodiment of the disclosure.

Further, using high-performance microprocessor in order to avoid the above-described issue may increase the cost of the light source unit.

Accordingly, in the embodiment of the disclosure, a plurality of modes relating to an appearance mode of the measured wavelength deviation indicating values are previously assumed, and information relating to combination of the variations ΔSr, ΔSg, and ΔSb of the light emitting intensity indicating values that are emitting intensity indicating value target variation information are prepared through previous calculation. The information relating to the combination of the variations ΔSr, ΔSg, and ΔSb of the light emitting intensity indicating values is information to determine variations of the light emitting intensity indicating values that are appropriate to each appearance mode, namely, the solution of the simultaneous equations.

In this case, the appearance mode of the wavelength deviation indicating values is an appearance pattern when the wavelength deviation indicating values appear. In the easiest pattern, one of the wavelength deviation indicating values Δλr, Δλg, and Δλb for the respective wavelength bands R, G, and B is not zero and other two values are zero. The pattern includes three cases, that is, a case in which only the wavelength deviation indicating value Δλr is not zero, a case in which only the wavelength deviation indicating value Δλg is not zero, and a case in which only the wavelength deviation indicating value Δλb is not zero.

When the three modes are adopted, the combination of the variations ΔSr, ΔSg, and ΔSb of the light emitting intensity indicating values serving as the light emitting intensity indicating value target variation information that is obtained by solving the above-described simultaneous equations in the case in which the wavelength deviation indicating value Δλr is not zero, the combination of the variations ΔSr, ΔSg, and ΔSb of the light emitting intensity indicating values serving as the light emitting intensity indicating value target variation information that is obtained by solving the above-described simultaneous equations in the case in which the wavelength deviation indicating value Δλg is not zero, and the combination of the variations ΔSr, ΔSg, and ΔSb of the light emitting intensity indicating values serving as the light emitting intensity indicating value target variation information that is obtained by solving the above-described simultaneous equations in the case in which the wavelength deviation indicating value Δλb is not zero, are determined and prepared through previous calculation.

In addition, a more complicated pattern is a case in which one of the wavelength deviation indicating values Δλr, Δλg, and Δλb is zero and the other two values are the same and not zero. The pattern includes three cases, that is, a case in which only the wavelength deviation indicating value Δλr is zero, a case in which only the wavelength deviation indicating value Δλg is zero, and a case in which only the wavelength deviation indicating value Δλb is zero. Typically, it is possible to adopt linear combination of the wavelength deviation indicating values Δλr, Δλg, and Δλb.

As just mentioned above, in the actual feedback control loop after the numerical information that is configured of the combination of the variations ΔSr, ΔSg, and ΔSb of the light emitting intensity indicating values serving as the light emitting intensity indicating value target variation information for each appearance mode of the wavelength deviation indicating values, synthesis calculation is performed from the numerical information of the combination of the variations ΔSr, ΔSg, and ΔSb of the light emitting intensity indicating values serving as the light emitting intensity indicating value target variation information for each appearance mode of the wavelength deviation indicating values, based on the measured light emitting intensity indicating values Sr, Sg and Sb and the measured deviations Δλr, Δλg, and Δλb from the respective reference wavelengths serving as the wavelength deviation indicating values. This results in the variations ΔSr, ΔSg, and ΔSb of the light emitting intensity indicating values that allows elimination of difference between the general color phase indicating values of the output luminous fluxes (Fo, Fo1, Fo2, . . . ) that are matched to the mode of the actual wavelength deviation indicating values Δλr, Δλg, and Δλb at that time and the target values thereof. This avoids the above-described issue.

In the following, the simplest three modes including the case in which only the wavelength deviation indicating value Δλr is not zero, the case in which only the wavelength deviation indicating value Δλg is not zero, and the case in which only the wavelength deviation indicating value Δλb is not zero are mainly discussed and more specifically described.

A state in which the general wavelengths λr, λg, and λb of the wavelength bands R, G, and B of the output luminous fluxes (Fo, Fo1, Fo2, . . . ) of the light source unit are equivalent to the respective reference wavelengths λro, λgo, and λbo and the chromaticity coordinates x and y and the brightness of light Y serving as the color phase indicating values achieve the respective target values xp, yp, and Yp is regarded as a normal state. In addition, it is assumed that the light emitting intensity indicating values in this state are Sr, Sg, and Sb.

When wavelength variation occurs on only the wavelength λr by a specified size ΔΛ, the values x, y, and Y are varied from the target values xp, yp, and Yp in the normal state. The resultant values may be predicted through application of Δλr=ΔΛ and Δλg=Δλb=0 to the expression 6, 12, 13, 14, 18, or 19.

The variations ΔSrr, ΔSgr, and ΔSbr to be respectively provided to the light emitting intensity indicating values Sr, Sg, and Sb in order to return the values x, y, and Y to the target values xp, yp, and Yp in the normal state are obtainable by applying the dumping coefficient D=1 to the expression 23 and solving the equations of the expression 22 or 29.

Note that the reason for the dumping coefficient D=1 is because the aim is not to gradually approximate the values x, y, and Y to the target values xp, yp, and Yp through the feedback control but to predict the variations of the light emitting intensity indicating values Sr, Sg, and Sb that allow the target values zp, yp, and Yp to be realized as accurate as possible.

When the correction is intentionally performed at insufficient level, the value D may be set to, for example, 0.9. In contrast, when the correction is performed at excess level, the value D may be set to, for example, 1.1. Thus, the value D may be appropriately adjusted.

In other words, with respect to the appearance mode Δλr=ΔΛ and Δλg=Δλb=0 of the wavelength deviation indicating values, the combination of the variations ΔSrr, ΔSrg, and ΔSbr of the light emitting intensity indicating values serving as the light emitting intensity indicating value target variation information obtained by solving the equations in the previous calculation are stored.

Further, also with respect to the appearance mode Δλg=ΔΛ and Δλr=Δλb=0 of the wavelength deviation indicating values, the equations are solved in a similar manner and the combination of the variations ΔSrg, ΔSgg, and ΔSbg of the light emitting intensity indicating values serving as the light emitting intensity indicating value target variation information are stored. Furthermore, also with respect to the appearance mode Δλb=ΔΛ and Δλr=Δλg=0 of the wavelength deviation indicating values, the equations are solved in a similar manner and the combination of the variations ΔSrb, ΔSgb, and ΔSbb of the light emitting intensity indicating values serving as the light emitting intensity indicating value target variation information are stored.

Note that the specific value of the wavelength variation ΔΛ in the assumption calculation may be set to about the maximum values of the respective actual variations Δλr, Δλg, and Δλb.

In addition, although the wavelength variation ΔΛ is common to the wavelength bands R, G, and B in the above-description, the wavelength variation in the assumption calculation may be set to an individual value for each of the wavelength bands.

The calculation of the light emitting intensity indicating value target variation information ΔSrr, ΔSgr, ΔSbr, ΔSrg, ΔSgg, ΔSrb, ΔSgb, and ΔSbb determined in the above description may be performed by, for example, a personal computer, and the values of the calculation result may be transferred to the integrated control circuit (Mc) and held by the integrated control circuit (Mc).

Note that, alternative to the normal state based on the chromaticity coordinates, a normal state based on the tristimulus values, namely, a state in which the wavelengths λr, λg, and λb of the general wavelength bands R, G, and B of the output luminous fluxes (Fo, Fo1, Fo2, . . . ) of the light source unit are equivalent to the respective reference wavelengths λro, λgo, and λbo and the tristimulus values X, Y and Z serving as the color phase indicating values and the brightness of light achieve the respective target values xp, yp, and Yp, may be used as the normal state. In this state, the dumping coefficient D=1 may be applied to the expression 17 for the appearance modes of the wavelength deviation indicating values Δλr=ΔΛ and Δλg=Δλb=0, Δλg=ΔΛ and Δλr=Δλb=0, and Δλb=ΔΛ and Δλr=Δλg=0, and the equations of the above-described expression 16 or 25 may be solved to determine and store the combination of the variations ΔSrr, ΔSgr, ΔSbr, ΔSrg, ΔSgg, ΔSbg, ΔSrb, ΔSgb, and ΔSbb of the light emitting intensity indicating values serving as the light emitting intensity indicating value target variation information.

Next, the procedure of the calculation to determine the variations ΔSr, ΔSg, and ΔSb is described. The calculation may be performed by the integrated control circuit (Mc) in the feedback control loop in the light source unit.

The actual wavelength deviation indicating values Δλr, Δλg, and Δλb may be determined through measurement. Then, the values Δλr, Δλg, and Δλb may be regarded as overlapping with Δλr=ΔΛ and Δλg=Δλb=0, Δλg=ΔΛ and Δλr=Δλb=0, and Δλb=ΔΛ and Δλr=Δλg=0 that are three types of assumed appearance modes of the wavelength deviation indicating values. Further, the light emitting intensity indicating value target variation information ΔSrr, ΔSgr, ΔSbr, ΔSrg, ΔSgg, ΔSbg, ΔSrb, ΔSgb, and ΔSbb that are combination of the variations of the light emitting intensity indicating values belonging to the respective appearance modes of the wavelength deviation indicating values may be overlapped therewith. This allows for determination of the variations ΔSr, ΔSg, and ΔSb of the light emitting intensity indicating values that allow for elimination of difference between the general color phase indicating values of the output luminous fluxes (Fo, Fo1, Fo2, . . . ) matched to the actual mode of the wavelength deviation indicating values Δλr, Δλg, and Δλb and the target values thereof.

The reason why such determination is possible is similar to the reason of the description for the above-described approximate expression 20, namely, the following expression (redescribed).

$$\Delta f = (\delta f/\delta u)\cdot \Delta u + (\delta f/\delta v)\cdot \Delta v + (\delta f/\delta w)\cdot \Delta w$$

However, the combinations of the variations ΔSrr, ΔSgr, ΔSbr, ΔSrg, ΔSgg, ΔSbg, ΔSrb, ΔSgb, and ΔSbb of the light emitting intensity indicating values determined in the previous calculation may be calculated by assuming the case in which each of the wavelength deviation indicating values Δλr, Δλg, and Δλb is the wavelength variation ΔΛ in the assumption calculation, namely, the specified value ΔΛ that is temporarily set. Therefore, it is necessary to multiply the value of a ratio relative to the value ΔΛ of each of the actual values Δλr, Δλg, and Δλb and add the resultant values, in the overlapping. This indicates that the calculation is performed by the following expressions (expression 31).

$$\Delta Sr = \Delta Srr\cdot \Delta\lambda r/\Delta\Lambda + \Delta Srg\cdot \Delta\lambda g/\Delta\Lambda + \Delta Srb\cdot \Delta\lambda b/\Delta\Lambda$$

$$\Delta Sg = \Delta Sgr\cdot \Delta\lambda r/\Delta\Lambda + \Delta Sgg\cdot \Delta\lambda g/\Delta\Lambda + \Delta Sgb\cdot \Delta\lambda b/\Delta\Lambda$$

$$\Delta Sb = \Delta Sbr\cdot \Delta\lambda r/\Delta\Lambda + \Delta Sbg\cdot \Delta\lambda g/\Delta\Lambda + \Delta Sbb\cdot \Delta\lambda b/\Delta\Lambda \quad \text{Expression 31}$$

When the wavelength variation ΔΛ in the assumption calculation is not common to the wavelength bands R, G, and B as mentioned above, it is necessary to calculate the value of the radio in accordance with the wavelength variation in the assumption calculation for each wavelength band.

Note that, even in the case in which synthesis calculation is performed from the numerical information of the combination of the variations of the light emitting intensity indicating values serving as the light emitting intensity indicating value target variation information for each appearance mode of the wavelength deviation indicating values to obtain the variations of the light emitting intensity indicating values allowing for elimination of difference between the general color phase indicating values of the output luminous fluxes (Fo, Fo1, Fo2, ... ) matched to the actual mode of the wavelength deviation indicating values Δλr, Δλg, and Δλb at the time and the respective target values thereof, it is possible to effectively use the above-described expressions 3, 4, and 5 for determination of the total output power Pr of the drive circuits driving the light emitting elements of the R wavelength band, the total output power Pg of the drive circuits driving the light emitting elements of the G wavelength band, and the total output power Pb of the drive circuits driving the light emitting elements of the B wavelength band, out of the above-described drive circuits (P1a, P1b, ... , P2a, P2b, ... ).

In other words, as mentioned above, the integrated control circuit (Mc) applies, to the expression 4, the light emitting intensity indicating values Sr, Sg, and Sb that are acquired on the basis of the band optical characteristic acquisition data (ShR, ShG, and ShB) acquired by the band optical characteristic acquisition means (AiR, AiG, and AiB), thereby updating the proportionality coefficients kr, kg, and kb.

Then, the integrated control circuit (Mc) may apply the just determined variations ΔSr, ΔSg, and ΔSb to the current values Sr, Sg, and Sb of the light emitting intensity indicating values of the expression 5, thereby calculating new target values Srp, Sgp, and Sbp of the light emitting intensity indicating values. Further, the integrated control circuit (Mc) may update the power Pr, Pg, and Pb of the drive circuits (P1a, P1b, ... , P2a, P2b, ... ) in accordance with the expression 3.

Thereafter, the process may be returned to operation to acquire the band optical characteristic acquisition data (ShR, ShG, and ShB), and repeating the above-described sequence may establish the feedback control loop.

Complemental description for the feedback control described above in the embodiment of the disclosure is now given.

In the description for the expressions 16, 17, and 26 or the description for the expressions 22, 23, and 29, it has been described that the equations in these expressions are equations to be solved in the feedback control loop. This is only applied to the case in which the feedback control is performed by the virtual integrated control circuit that has the function of calculating the tristimulus values X, Y and Z or the values of the chromaticity coordinates x and y serving as the color phase indicating values.

In contrast, in the case of the integrated control circuit (Mc) of the light source unit according to the embodiment of the disclosure, the function of calculating the color phase indicating values is unnecessary. Therefore, it is not possible for the integrated control circuit (Mc) to solve the equations. Alternative to solving of the equations, the integrated control circuit (Mc) holds the light emitting intensity indicating value target variation information that is the solution of the previous calculation for the assumed appearance mode of the wavelength deviation indicating values, and appropriately scales and synthesizes, in the feedback control loop, the light emitting intensity indicating value target variation information, based on the pattern of the actual appearance mode of the wavelength deviation indicating values that are acquired on the basis of the band optical characteristic acquisition data (ShR, ShG, and ShB) acquired by the band optical characteristic acquisition means (AiR, AiG, and AiB), thereby obtaining practical solutions of the variations ΔSr, ΔSg, and ΔSb of the light emitting intensity indicating values. This is the feature of the disclosure.

After the solutions are obtained, the integrated control circuit (Mc) performs the feedback control to bring the light emitting intensity indicating values Sr, Sg, and Sb that are acquired on the basis of the band optical characteristic acquisition data (ShR, ShG, and ShB) acquired by the band optical characteristic acquisition means (AiR, AiG, and AiB) as mentioned above close to the target values Srp, Sgp, and Sbp thereof. Only performing the feedback control achieves the target color phase indicating values.

As mentioned above, even if variation in the light source unit and change caused by deterioration occur in the relationship between the light emitting intensity indicating values Sr, Sg, and Sb (or the target values Srp, Sgp, and Sbp thereof) and the output power Pr, Pg, and Pb of the drive circuits (P1a, P1b, ... , P2a, P2b, ... ), performing control using the proportionality coefficients kr, kg, and kb makes it possible to conform the relationship.

In addition, adjusting the correction coefficient that is regarded to be commonly multiplied with the band optical characteristic acquisition data (ShR, ShG, and ShB) generated by the band optical characteristic acquisition means (AiR, AiG, and AiB) makes it possible to individually adjust the intensity of the output luminous flux (Fo) obtained by the feedback control, for each light source unit.

In other words, individual differences of the light source unit caused by differences in the characteristics of the respective parts in the light source unit are adjustable through scaling in the parts of the light source unit. Therefore, the target value Yp of the brightness indicating value and the light emitting intensity indicating values Sr, Sg, and Sb corresponding to the normal state are not necessarily determined individually for each light source unit and the same values are commonly used in a plurality of light source units. Accordingly, if the target values xp and yp of the chromaticity coordinates are common, it is possible for the plurality of light source units to hold the same light emitting intensity indicating value target variation information.

In addition, it is unnecessary for the specific values to follow the standard unit system of the physical amount, and it is sufficient for the specific values to be scaled to relative values within the data type (for example, an unsigned 16-bit integer) that is easily handled by the microprocessor of the integrated control circuit (Mc). In contrast, when the values same as these values or corresponding to these values are handled by the apparatus performing the previous calculation, the values are scaled to the same scale and are represented using, for example, a floating-point variable.

Note that, since the target values xp and yp of the chromaticity coordinates appear only in the apparatus that performs the previous calculation, the values typically defined may be represented using, for example, a floating-point variable.

In contrast, the wavelength variation ΔΛ in the assumption calculation that is a constant for standardization of the wavelength deviation indicating values Δλr, Δλg, and Δλb appears both in the apparatus that performs the previous calculation and in the integrated control circuit (Mc) of the light source unit. Therefore, it is necessary to accurately determine a scaling coefficient for conversion of the value represented by a value easily handled by the integral control circuit (Mc) into the actual physical value handled by the apparatus performing the previous calculation.

The above-described expression 20 and the expression 31 according thereto are based on the primary approximation; however, increasing the order of the approximation to second or higher order makes it possible to enhance elimination accuracy of the difference between the color phase indicating values and the target values thereof.

In this example, the three modes including the case in which only the wavelength deviation indicating value $\Delta\lambda r$ is not zero, the case in which only the wavelength deviation indicating value $\Delta\lambda g$ is not zero, and the case in which only the wavelength deviation indicating value $\Delta\lambda b$ is not zero have been described. The complemental description for a case in which linear combination of the wavelength deviation indicating values is used as the appearance mode is given. In the case in which there are three modes, namely, a case in which only a certain linear combination for the wavelength deviation indicating values $\Delta\lambda r$, $\Delta\lambda g$, and $\Delta\lambda b$ is not zero, a case in which another linear combination is not zero, and a case in which still another linear combination is not zero, the respective groups of the actual wavelength deviation indicating values $\Delta\lambda r$, $\Delta\lambda g$, and $\Delta\lambda b$ may be resolved into components of the respective linear combinations, and overlapping may be performed by multiplying the existence ratio of the respective components such as $\Delta\lambda r/\Delta\Lambda$ in the wavelength deviation indicating value to determine the variations $\Delta Sr$, $\Delta Sg$, and $\Delta Sb$ in a similar manner.

The appearance mode of such a linear combination is applicable to, for example, a case in which the deviation from the reference wavelength has correlation between a certain wavelength band and other wavelength band.

The processing when dimming is performed is described.

When dimming is performed to change the brightness of light Y to Yp' in the above-described normal state, namely, in a state where the general wavelengths $\lambda r$, $\lambda g$, and $\lambda b$ of the wavelength bands R, G, and B of the output luminous fluxes (Fo, Fo1, Fo2, . . . ) of the light source unit are respectively equivalent to the reference wavelengths $\lambda ro$, $\lambda go$, and $\lambda bo$ and the chromaticity coordinates x and y and the brightness of light Y serving as the color phase indicating values achieve the respective target values xp, yp, and Yp, the above-described expression 31 is first applied to the light emitting intensity indicating values Sr, Sg, and Sb corresponding to the normal state to determine variations $\Delta Sr$, $\Delta Sg$, and $\Delta Sb$, indifferent to the dimming (assuming that dimming is not performed). Thereafter, a dimming rate t that is calculated from $\mu=Yp'/Yp$ is multiplied by light emitting intensity indicating values Sr, Sg, and Sb and the variations $\Delta Sr$, $\Delta Sg$, and $\Delta Sb$ to determine Sr', Sg', Sb' and $\Delta Sr'$, $\Delta Sg'$, $\Delta Sb'$. The above-described expression 5 is applied to the determined values Sr', Sg', Sb' and $\Delta Sr'$, $\Delta Sg'$, $\Delta Sb'$ in place of the values Sr, Sg, and Sb and the variations $\Delta Sr$, $\Delta Sg$, and $\Delta Sb$ to determine the target values Srp, Sgp, and Sbp, thereby determining the output power Pr, Pg, and Pb through the proportionality coefficients kr, kg, and kb in the above-described manner.

This allows for scaling without varying the ratio of the light emitting intensity indicating values Sr, Sg, and Sb, which makes it possible to control the brightness of light to desired brightness or dimming while maintaining specified general color phase of the output luminous fluxes (Fo, Fo1, Fo2, . . . ).

When one of the light emitting intensity indicating values Sr, Sg, and Sb is separately determined for any reason, the process is performed similarly. For example, when the light emitting intensity indicating value Sg is separately determined, the solution of the above-described expression 24 is previously calculated under the condition of $\Delta\lambda r=\Delta\Lambda$ and $\Delta\lambda g=\Delta\lambda b=0$, $\Delta\lambda g=\Delta\Lambda$ and $\Delta\lambda r=\Delta\lambda b=0$, and $\Delta\lambda b=\Delta\Lambda$ and $\Delta\lambda r=\Delta\lambda g=0$ that is the assumed appearance mode of the wavelength deviation indication values. Then, the solutions are overlapped according to the existence ratio of the components such as $\Delta\lambda r/\Delta\Lambda$ to determine other variations $\Delta Sr$ and $\Delta Sb$, as mentioned above.

In the embodiment of the disclosure, however, use of the processing when the dimming is performed is easier.

In other words, for example, when the light emitting intensity indicating value Sg is separately determined, the dimming rate may be calculated from $\mu=Sg''/(Sg+\Delta Sg)$ such that the value $Sg+\Delta Sg$ to be calculated by the above-described expression 5 becomes Sg'' of the value Sg separately determined, and then the processing when the dimming is performed may be applied.

Such control makes it possible to maintain the specified color phase even when it is not possible to achieve the desired brightness of light.

The feedback control when synthesis calculation is performed from the numerical information of the combination of the variations of the light emitting intensity indicating values serving as the light emitting intensity indicating value target variation information for each appearance mode of the wavelength deviation indicating values to obtain the variations of the light emitting intensity indicating values allowing for elimination of difference between the general color phase indicating values of the output luminous fluxes (Fo, Fo1, Fo2, . . . ) matched to the actual mode of the wavelength deviation indicating values $\Delta\lambda r$, $\Delta\lambda g$, and $\Delta\lambda b$ at the time and the respective target values, is summarized as follows.

First, the local band color matching function information relating to the color matching functions $xe(\lambda)$, $ye(\lambda)$, and $ze(\lambda)$, namely, the coefficients Hxro, Hxgo, Hxbo, Hyro, Hygo, Hybo, Hzro, Hzgo, and Hzbo that are functional values of the color matching functions at the reference wavelengths $\lambda ro$, $\lambda go$, and $\lambda bo$ of the respective wavelength bands R, G, and B, the coefficients Fxro, Fyro, Fzro, Fxgo, Fygo, Fzgo, Fxbo, Fybo, and Fzbo that are the values of the gradients of the color matching functions at the reference wavelengths, and the values Ir, Ig, and Ib of the expression 18 are prepared. Then, the reference wavelength $\lambda ro$, $\lambda go$, and $\lambda bo$ and the chromaticity coordinate target values xp and yp in the normal state, the target value Yp of the brightness of light, the light emitting intensity indicating values Sr, Sg, and Sb, and the wavelength variation $\Delta\Lambda$ in the assumption calculation are determined. Thereafter, the equations of the above-described expression 23 and the expression 22 or 29 to which the dumping coefficient D=1 is applied are solved to previously calculate the light emitting intensity indicating value target variation information $\Delta Srr$, $\Delta Sgr$, $\Delta Sbr$, $\Delta Srg$, $\Delta Sgg$, $\Delta Sbg$, $\Delta Srb$, $\Delta Sgb$, and $\Delta Sbb$ for the appearance mode of the wavelength deviation indicating values $\Delta\lambda r=\Delta\Lambda$ and $\Delta\lambda g=\Delta\lambda b=0$, $\Delta\lambda g=\Delta\Lambda$ and $\Delta\lambda r=\Delta\lambda b=0$, and $\Delta\lambda b=\Delta\Lambda$ and $\Delta\lambda r=\Delta\lambda g=0$.

Note that, as mentioned above, the calculation may be executed by an apparatus that performs previous calculation, such as a personal computer, and the values of the calculation result may be transferred to the integral control circuit (Mc) and held by the integral control circuit (Mc).

The integral control circuit (Mc) determines appropriate initial target values Srp, Sgp, and Sbp of the light emitting intensity indicating values Sr, Sg, and Sb for the respective wavelength bands R, G, and B and also determines appropriate initial values of the proportionality coefficients kr, kg, and kb. Then, the integral control circuit (Mc) sets the power Pr, Pg, and Pb of the drive circuits (P1$a$, P1$b$, . . . , P2$a$, P2$b$, . . . ) through the expression 3 to start driving of the light emitting elements (Y1$a$, Y1$b$, . . . , Y2$a$, Y2$b$, . . . ), and waits for a warming-up operation period that is appropriately defined.

The integrated control circuit (Mc) applies the light emitting intensity indicating values Sr, Sg, and Sb that are acquired on the basis of the band optical characteristic acquisition data (ShR, ShG, and ShB) acquired by the band optical characteristic acquisition means (AiR, AiG, and AiB) and the original target values Srp, Sgp and Sbp to the expression 4, thereby updating the proportionality coefficients kr, kg, and kb.

In addition, the integrated control circuit (Mc) applies the values of deviations $\Delta\lambda r$, $\Delta\lambda g$, and $\Delta\lambda b$ from the respective reference wavelengths serving as the wavelength deviation indicating values that are similarly acquired on the basis of the band optical characteristic acquisition data (ShR, ShG, and ShB), to the above-described expression 31, thereby determining the variations $\Delta Sr$, $\Delta Sg$, and $\Delta Sb$ of the light emitting intensity indicating values.

The integrated control circuit (Mc) applies the just-determined variations $\Delta Sr$, $\Delta Sg$, and $\Delta Sb$ to the expression 5 with respect to the current light emitting intensity indicating values Sr, Sg, and Sb, to calculate new target values Srp, Sgp and Sbp of the light emitting intensity indicating values. Further, the integrated control circuit (Mc) updates the power Pr, Pg, and Pb of the drive circuits (P1$a$, P1$b$, . . . , P2$a$, P2$b$, . . . ) in accordance with the expression 3.

Thereafter, the process may return to the operation to acquire the band optical characteristic acquisition data (ShR, ShG, and ShB), and repeating the above-described sequence may establish the feedback control loop.

As mentioned above, according to the embodiment of the disclosure, the plurality of modes relative to the appearance mode of the measured wavelength deviation indicating values are previously assumed. In addition, the information to determine the variations of the light emitting intensity indicating values matched to each appearance mode, namely, the information relating to the combination of the variations $\Delta Sr$, $\Delta Sg$, and $\Delta Sb$ of the light emitting intensity indicating values serving as the light emitting intensity indicating target variation information derived from the simultaneous equations are prepared through the previous calculation. Therefore, the light source unit performs, in the actual feedback control loop, synthesis calculation from the numerical information of the combination of the variations $\Delta Sr$, $\Delta Sg$, and $\Delta Sb$ of the light emitting intensity indicating values serving as the light emitting intensity indicating value target variation information for each appearance mode of the wavelength deviation indicating values, without solving the simultaneous equations. This makes it possible for the light source unit to perform efficient feedback control without including a high-performance microprocessor.

Complemental description for validity of approximation of the luminous flux to be measured $S(\lambda)$ by a delta function described in the above-described expression 11 is now given.

When a plurality of light emitting elements are collected, variation of the emission wavelength occurs even through the colors of the light emitting elements are the same. Therefore, the spectrum $S(\lambda)$ of the integrated light is not accurately equivalent to the delta function as described in the expression 11.

Even if variation of the emission wavelength occurs, however, the above-described discussion is established when all of the light emitting elements belonging to the same wavelength band are integrated and are replaced with a virtual single color light source having a wavelength equivalent to an average value of the wavelengths of the light emitting elements.

Incidentally, when all of the light emitting elements belonging to the same wavelength band are integrated, the spectrum width is expanded due to the variation of the wavelengths, which results in slight movement of the chromaticity coordinates in the white color direction.

The movement, however, is very small and the aim of the calculation of the chromaticity coordinates and other values of the light source unit is not to determine accurate absolute values but to correct, through the feedback control, unbalanced white balance that is caused by variation of the emission wavelength due to temperature increase of the light emitting element or other factor. The expansion of the spectrum width caused by variation of the wavelength occurs before such variation of the emission wavelength occurs. Therefore, the expansion of the spectrum width does not influence practical usage for the purpose of the calculation.

As the band optical characteristic acquisition means of the light source unit, the band optical characteristic acquisition means (AiR) illustrated in FIG. 3 that uses the wavelength dispersive optical element (Eg) to measure the wavelength deviation indicating values has been described; however, the band optical characteristic acquisition means applicable to the light source unit according to the embodiment of the disclosure is not limited thereto.

For example, in the light source unit according to the embodiment of the disclosure, each of the band optical characteristic acquisition means (AiR, AiG, and AiB) of one or more of the wavelength bands may be configured of a first light amount measurement means (A1R, A1G, and A1B) that has first spectral sensitivity characteristics of the corresponding wavelength band and a second light amount measurement means (A2R, A2G, and A2B) that has second spectral sensitivity characteristics of the corresponding wavelength band. The first spectral sensitivity characteristics and the second spectral sensitivity characteristics are different in variation rate of the sensitivity with respect to the wavelength variation, namely, in gradient of the sensitivity variation in the wavelength variation from each other. The integrated control circuit (Mc) may have the local band spectral sensitivity information that includes sensitivity value at the reference wavelength and the variation rate of the sensitivity with respect to the wavelength variation in each of the first spectral sensitivity characteristics and the second spectral sensitivity characteristics in the corresponding wavelength band. In addition, the integrated control circuit (Mc) may acquire first light amount measurement data (Sh1R, Sh1G, and Sh1B) that are generated by the first light amount measurement means (A1R, A1G, and A1B) and second light amount measurement data (Sh2R, Sh2G, and Sh2B) that are generated by the second light amount measurement means (A2R, A2G, and A2B). The first measurement amount measurement data (Sh1R, Sh1G, and Sh1B) and the second light amount measurement data (Sh2R, Sh2G, and Sh2B) are the band optical characteristic acquisition data (ShR, ShG, and ShB). Then, the integrated control circuit (Mc) uses the local band spectral sensitivity information to generate and acquire the light emitting intensity indicating values and the wavelength deviation indicating values from the first light amount measurement data (Sh1R, Sh1G, and Sh1B) and the second light amount measurement data (Sh2R, Sh2G, and Sh2B).

Figure 5:
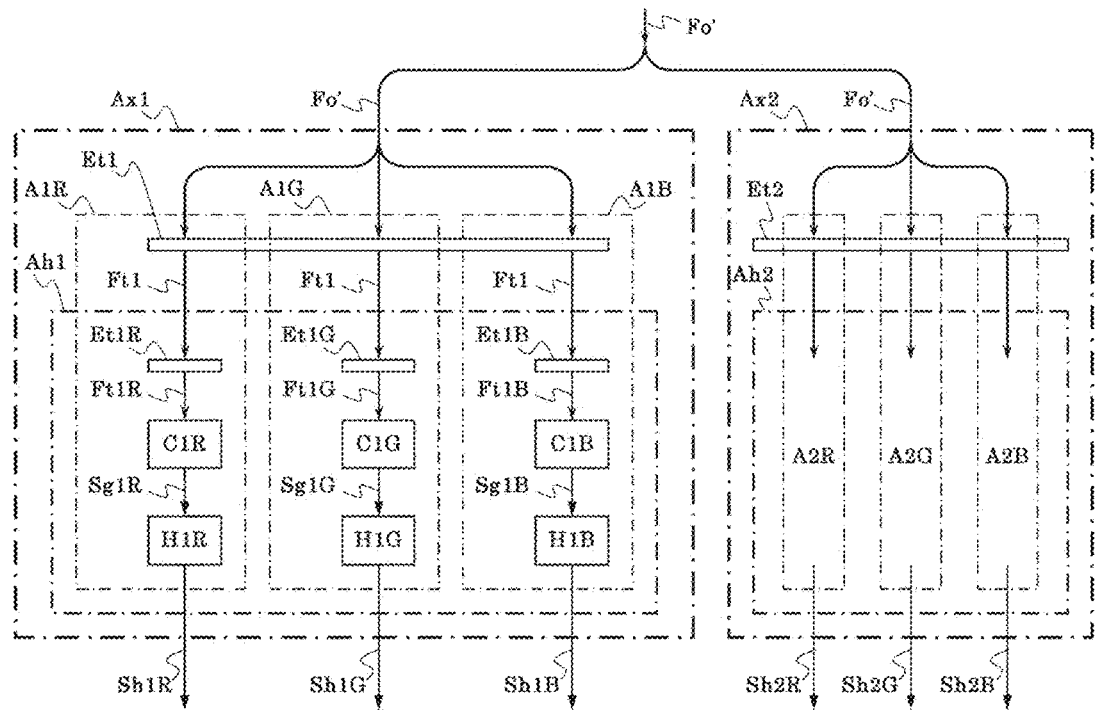
FIG. 5 is a block diagram illustrating a portion of the light source unit according to the embodiment of the disclosure in a simplified manner.

The configuration example of the first light amount measurement means (A1R, A1G, and A1B) is described with reference FIG. 5 that is a block diagram illustrating a portion of the light source unit according to the embodiment of the disclosure in a simplified manner.

Note that, in the light source unit according to the embodiment of the disclosure, each of the band optical characteristic acquisition means (AiR, AiG, and AiB) for one or more wavelength bands is configured of the first light amount measurement means having the first spectral sensitivity characteristics of the corresponding wavelength band and the second light amount measurement means having the second spectral sensitivity characteristics of the corresponding wavelength band. The illustration is, however, given on the assumption that the band optical characteristic acquisition means (AiR, AiG, and AiB) for all wavelength bands are configured as described above.

Accordingly, in the light source unit in the figure, the measurement-use output luminous flux (Fo') enters the first light amount measurement means (A1R, A1G, and A1B) that are provided for the above-described respective wavelength bands, and the same measurement-use output luminous flux (Fo') enters the second light amount measurement means (A2R, A2G, and A2B) that are provided for the above-described respective wavelength bands.

In the figure, the first light amount measurement means (A1R, A1G, and A1B) for the respective wavelength bands R, G, and B are grouped into a first light amount measurement means group (Ax1) for convenience. Also, the second light amount measurement means (A2R, A2G, and A2B) for the respective wavelength bands R, G, and B are grouped into a second light amount measurement means group (Ax2) for convenience. Alternatively, for example, the first light amount measurement means for R color and the second light amount measurement means for R color may be grouped, the first light amount measurement means for G color and the second light amount measurement means for G color may be grouped, and the first light amount measurement means for B color and the second light amount measurement means for B color may be grouped.

Further, in the figure, the measurement-use output luminous flux (Fo') that is a bundle of the optical fluxes extracted from the output luminous fluxes (Fo1, Fo2, . . . ) for the respective wavelength bands is divided to enter the band optical characteristic acquisition means (AiR, AiG, and AiB). However, the measurement-use output luminous fluxes for the respective wavelength bands may directly enter the corresponding band optical characteristic acquisition means (AiR, AiG, and AiB) for the respective wavelength bands without being bundled.

In the first light amount measurement means (A1R, A1G, and A1B), the measurement-use output luminous flux (Fo') enters a characteristic filter (Et1), and a measurement-use output luminous flux (Ft1) that has passed through the characteristic filter (Et1) passes through band filters (Et1R, Et1G, and Et1B) of the three colors R, G, and B. This results in generation of the measurement-use output luminous fluxes (Ft1R, Ft1G, and Ft1B) of the three colors R, G, and B. The measurement-use output luminous fluxes (Ft1R, Ft1G, and Ft1B) are respectively received by optical sensors for respective colors (C1R, C1G, and C1B).

Photodetection signals (Sg1R, Sg1G, and Sg1B) from the respective optical sensors (C1R, C1G, and C1B) are subjected to necessary processing such as amplification and AD conversion by respective signal processing circuits (H1R, H1G, and H1B). As a result, the first light amount measurement data (Sh1R, Sh1G, and ShB) that are each configured of information of light amount in each of the wavelength bands R, G, and B are generated.

In addition to the spectral sensitivity characteristics caused by the characteristic filter (Et1) and the band filters (Et1R, Et1G, and Et1B), spectral sensitivity characteristics of the optical sensors (C1R, C1G, and C1B) are reflected to the spectral sensitivity characteristics of the first light amount measurement means (A1R, A1G, and A1B).

Note that the characteristic filter (Et1) that is provided commonly to the first light amount measurement means (A1R, A1G, and A1B) is described; however, the characteristic filter may be provided individually for each of the first light amount measurement means (A1R, A1G, and A1B).

Further, the signal processing circuits (H1R, H1G, and H1B) that are provided individually for the respective photodetection signals (Sg1R, Sg1G, and Sg1B) are described; however, the signal processing circuit may be provided commonly to the photodetection signals (Sg1R, Sg1G, and Sg1B) with an analog multiplexer that selects one of the photodetection signals (Sg1R, Sg1G, and Sg1B) in accordance with a selection signal.

The same applies to the second light amount measurement means (A2R, A2G, and A2B). The second light amount measurement means (A2R, A2G, and A2B) may include, in place of the characteristic filter (Et1), a characteristic filter (Et2) different in spectral sensitivity characteristics from the characteristic filter (Et1), and the rear stage subsequent to the characteristic filter (Et2) of the second light intensity measurement means (A2R, A2G, and A2B) may be configured using an optical sensor circuit section same as the optical sensor circuit section (Ah1) of the first light amount measurement means (A1R, A1G, and A1B) that is configured of the band filters (Et1R, Et1G, and Et B), the optical sensors (C1R, C1G, and C1B), and the signal processing circuits (H1R, H1G, and H1B). This makes it possible to generate second light amount measurement data (Sh2R, Sh2G, and Sh2B).

Then, the integrated control circuit (Mc) may read the first light amount measurement data (Sh1R, Sh1G, and Sh1B) and the second light intensity measurement data (Sh2R, Sh2G, and Sh2B).

The characteristic filter (Et1) and the band filters (Et1R, Et1G, and Et1B) of the first light amount measurement means (A1R, A1G, and A1B) may not be separated, and each of the band filters (Et1R, Et1G, and Et1B) may be configured to further have a function of the characteristic filter (Et1). The same applies to the band filters of the second light amount measurement means (A2R, A2G, and A2B).

In addition, the characteristic filter of one of the first light amount measurement means (A1R, A1G, and A1B) and the second light amount measurement means (A2R, A2G, and A2B) may be transparent.

As described with reference to FIG. 1 above, in the case in which the output luminous fluxes (Fo1, Fo2, . . . ) are used independently for each of colors R, G, and B, each of the optical sensors (C1R, C1G, and C1B) is not collectively mounted in the optical sensor circuit section (Ah1) but may be configured separately.

Regarding the first spectral sensitivity characteristics of the first light amount measurement means (A1R, A1G, and A1B) and the second spectral sensitivity characteristics of the second light amount measurement means (A2R, A2G, and A2B) for each of the wavelength bands R, G, and B, it is sufficient to achieve a state in which a variation rate of sensitivity against wavelength variation, namely, the gradient of sensitivity variation when the wavelength varies, are different in each of the wavelength bands.

More specifically, when expressions 35, 36, and 37 described later are regarded as simultaneous linear equation with two unknowns relating to Sr and Sr·Δλr, Sg and Sg·Δλg, and Sb and Sb·Δλb, respectively, it is sufficient to achieve a state in which a determinant of each equation is not zero.

In this case, the spectral sensitivity characteristics indicate a set of the spectral sensitivity characteristics of the R wavelength band, the spectral sensitivity characteristics of the G wavelength band, and the spectral sensitivity characteristics of the B wavelength band.

Incidentally, non-limiting examples of the case of difference of the variation rate of sensitivity against wavelength variation in one wavelength band may include a case in which one of the first spectral sensitivity characteristics and the second spectral sensitivity characteristics is positive and the other is negative, one of them is substantially zero and the other is not zero (a finite value), and a case in which both of them have the same symbol but the absolute values thereof are different from each other. Any case may be possible.

Restriction of the variation rate of sensitivity against wavelength variation is limited to within a bandwidth that is defined by an upper limit and a lower limit of the wavelength variation caused by fluctuation of the light emitting elements (Y1a, Y1b, . . . , Y2a, Y2b, . . . ) mounted on the light source unit and emission wavelength variation in the assumed temperature range. The spectral sensitivity characteristics outside the bandwidth do not matter.

When, out of the light emitting elements (Y1a, Y1b, . . . , Y2a, Y2b, . . . ), the light emitting elements used for one wavelength band are unified to the same products manufactured by the same manufacturer, the bandwidth is normally from about several nanometers to about ten nanometers. Regarding the first spectral sensitivity characteristics and the second spectral sensitivity characteristics, however, variation of the variation rate of sensitivity against wavelength variation in the bandwidth may be desirably small.

The integrated control circuit (Mc) has local band spectral sensitivity information that is configured of the sensitivity value at the reference wavelength and the variation rate of sensitivity against wavelength variation for each of the wavelength bands R, G, and B, for each of the first spectral sensitivity characteristics and the second spectral sensitivity characteristics.

Accordingly, as described later, the integrated control circuit (Mc) uses the local color spectral sensitivity information to approximately calculate the light emitting intensity indicating values correlated with the light intensity and the wavelength deviation indicating values correlated with the deviation from the reference wavelength for the respective wavelength bands R, G, and B, on the basis of the first light amount measurement data (Sh1R, Sh1G, and Sh1B) read from the first light amount measurement means (A1R, A1G, and A1B) and the second light amount measurement data (Sh2R, Sh2G, Sh2B) read from the second light amount measurement means (A2R, A2G, and A2B).

A method of calculating the light emitting intensity indicating values and the deviation from the reference wavelength that is the wavelength deviation indicating values, on the basis of the first light amount measurement data (Sh1R, Sh1G, and Sh1B) and the second light amount measurement data (Sh2R, Sh2G, and Sh2B) is described. The first light amount measurement data (Sh1R, Sh1G, and Sh1B) and the second light amount measurement data (Sh2R, Sh2G, and Sh2B) are obtained by measuring a luminous flux to be measured, with use of the first light amount measurement means (A1R, A1G, and A1B) and the second light amount measurement means (A2R, A2G, and A2B). The luminous flux to be measured is represented by the spectrum $S(\lambda)$ having a wavelength $\lambda$ as a parameter.

When the first light amount measurement means (A1R, A1G, and A1B) include respective spectral sensitivity characteristics $rm(\lambda)$, $gm(\lambda)$, and $bm(\lambda)$ in the respective wavelength bands R, G, and B, light amount measurement data values Rm, Gm, and Bm in the respective wavelength bands R, G, and B included in the first light amount measurement data (Sh1R, Sh1G, and Sh1B) are represented by the following expressions (Expression 32).

$$Rm = \int S(\lambda) \cdot rm(\lambda) \cdot d\lambda$$

$$Gm = \int S(\lambda) \cdot gm(\lambda) \cdot d\lambda$$

$$Bm = \int S(\lambda) \cdot bm(\lambda) \cdot d\lambda \qquad \text{Expression 32}$$

Likewise, when the second light amount measurement means (A2R, A2G, and A2B) include respective spectral sensitivity characteristics $rn(\lambda)$, $gn(\lambda)$, and $bn(\lambda)$ in the respective wavelength bands R, G, and B, light amount measurement data values Rn, Gn, and Bn in the respective wavelength bands R, G, and B included in the second light amount measurement data (Sh2R, Sh2G, and Sh2B) are represented by the following expressions (expression 33).

$$Rn = \int S(\lambda) \cdot rn(\lambda) \cdot d\lambda$$

$$Gn = \int S(\lambda) \cdot gn(\lambda) \cdot d\lambda$$

$$Bn = \int S(\lambda) \cdot bn(\lambda) \cdot d\lambda \qquad \text{Expression 33}$$

These integration regions cover the respective wavelength bands including a spectrum of at least the luminous flux to be measured $S(\lambda)$.

Here, when the luminous flux to be measured $S(\lambda)$ is approximated to be configured of three primary colors R, G, and B, the luminous flux to be measured $S(\lambda)$ is represented by the above-described expression 11 (redescribed) with use of the delta function $\delta(\lambda)$.

$$Sr(\lambda) = Sr \cdot \delta(\lambda - \lambda ro - \Delta\lambda r)$$

$$+ Sg \cdot \delta(\lambda - \lambda go - \Delta\lambda g)$$

$$+ Sb \cdot \delta(\lambda - \lambda bo - \Delta\lambda b) \qquad \text{Expression 11}$$

Where, the reference wavelengths of R, G, and B are respectively denoted by $\lambda ro$, $\lambda go$, and $\lambda bo$, the deviations from the reference wavelength serving as the wavelength deviation indicating values are respectively denoted by $\Delta\lambda r$, $\Delta\lambda g$, and $\Delta\lambda b$, and the light emitting intensity indicating values of the wavelength bands R, G, and B are respectively denoted by Sr, Sg, and Sb.

Typically, variation $\Delta f$ in the function $f = f(\lambda)$ when the variable $\lambda$ of the function f is slightly varied by $\Delta\lambda$ is approximated by the above-described expression 7 (redescribed below) with use of the derivative $df/d\lambda$ of the function f.

$$\Delta\lambda = (df/d\lambda)\cdot\Delta\lambda \qquad \text{Expression 7}$$

Accordingly, when the variable $\lambda$ near $\lambda ro$ is represented by $\lambda = \lambda ro + \Delta\lambda r$, the spectral sensitivity characteristics are represented by the following expressions (expression 34).

$$rm(\lambda) = rm(\lambda ro + \Delta\lambda r) = rm(\lambda ro) + Ermo\cdot\Delta\lambda r$$

$$rn(\lambda) = rn(\lambda ro + \Delta\lambda r) = rn(\lambda ro) + Erno\cdot\Delta\lambda r \qquad \text{Expression 34}$$

Where, Ermo and Erno are values when the variable $\lambda$ in the derivative of $rm(\lambda)$ and $rn(\lambda)$ is $\lambda ro$.

When the expressions 11 and 34 are applied to the first expression of each of the expressions 32 and 33, the following expressions (expression 35) are obtained.

$$Rm = Sr\cdot\int\delta(\lambda - \lambda ro - \Delta\lambda r)\cdot rm(\lambda)\cdot d\lambda$$

$$= Sr\cdot rm(\lambda ro + \Delta\lambda r)$$

$$= Sr\cdot[rm(\lambda ro) + Ermo\cdot\Delta\lambda r]$$

$$Rn = Sr\cdot[rn(\lambda ro) + Erno\cdot\Delta\lambda r]$$

where, $$Ermo = drm/d\lambda(\lambda = \lambda ro)$$

$$Erno = drn/d\lambda(\lambda = \lambda ro) \qquad \text{Expression 35}$$

These expressions are rewritten in the following manner.

$$Rm = rm(\lambda ro)\cdot Sr + Ermo\cdot Sr\cdot\Delta\lambda r$$

$$Rn = rn(\lambda ro)\cdot Sr + Erno\cdot Sr\cdot\Delta\lambda r$$

As described above, these expressions are simultaneous linear equation with two unknowns relating to $Sr$ and $Sr\cdot\Delta\lambda r$. Therefore, the expressions are solved by elementary calculation to obtain the values $Sr$ and $Sr\cdot\Delta\lambda r$, or the values $Sr$ and $\Delta\lambda r$.

Likewise, when the variable $\lambda$ near $\lambda go$ is represented by $\lambda = \lambda go + \Delta\lambda g$, the following expressions (expression 36) are obtained.

$$Gm = Sg\cdot[gm(\lambda go) + Egmo\cdot\Delta\lambda g]$$

$$Gn = Sg\cdot[gn(\lambda go) + Egno\cdot\Delta\lambda g]$$

where, $$Egmo = dgm/d\lambda(\lambda = \lambda go)$$

$$Egno = dgn/d\lambda(\lambda = \lambda go) \qquad \text{Expression 36}$$

Further, when the variable $\lambda$ near $\lambda bo$ is represented by $\lambda = \lambda bo + \Delta\lambda b$, the following expressions (expression 37) are obtained.

$$Bm = Sb\cdot[bm(\lambda bo) + Ebmo\cdot\Delta\lambda b]$$

$$Bn = Sb\cdot[bn(\lambda bo) + Ebno\cdot\Delta\lambda b]$$

where, $$Ebmo = dbm/d\lambda(\lambda = \lambda bo)$$

$$Ebno = dbn/d\lambda(\lambda = \lambda bo) \qquad \text{Expression 37}$$

Accordingly, it is possible to obtain the values $Sg$ and $\Delta\lambda g$ and the values $Sb$ and $\Delta\lambda b$ from these expressions.

Determination of the light emitting intensity indicating values $Sr$, $Sg$, and $Sb$ and the deviations from the reference wavelength that are the wavelength deviation indicating values, based on the light amount measurement data values $Rm$, $Gm$, and $Bm$ that are measured with use of the first light amount measurement means (A1R, A1G, and A1B) and the light amount measurement data values $Rn$, $Gn$, and $Bn$ that are measured with use of the second light amount measurement means (A2R, A2G, and A2B), is summarized as follows.

The local band spectral sensitivity information relating to the first light amount measurement means (A1R, A1G, and AiB), namely, the values $rm(\lambda ro)$, $gm(\lambda go)$, and $bm(\lambda bo)$ of the spectral sensitivity characteristics $rm(\lambda)$, $gm(\lambda)$, and $bm(\lambda)$ at the reference wavelengths $\lambda ro$, $\lambda go$, and $\lambda bo$ of the respective wavelength bands R, G, and B and the values Ermo, Egmo, and Ebmo of the variation rate of sensitivity against wavelength variation of the spectral sensitivity characteristics are prepared in advance. Further, the local band spectral sensitivity information relating to the second light amount measurement means (A2R, A2G, and A2B), namely, the values $m(\lambda ro)$, $gn(\lambda go)$, and $bn(\lambda bo)$ of the spectral sensitivity characteristics $m(\lambda)$, $gn(\lambda)$, and $bn(\lambda)$ at the reference wavelengths $\lambda ro$, $\lambda go$, and $\lambda bo$ of the respective wavelength bands R, G, and B and the values Erno, Egno, and Ebno of the variation rate of sensitivity against wavelength variation of the spectral sensitivity characteristics are prepared in advance.

Then, when the light amount measurement data values $Rm$, $Gm$, and $Bm$ by the first light amount measurement means (A1R, A1G, and A1B) and the light amount measurement data values $Rn$, $Gn$, and $Bn$ by the second light amount measurement means (A2R, A2G, and A2B) are obtained, it is possible to easily determine the light emitting intensity indicating values $Sr$, $Sg$, and $Sb$ and the deviations $\Delta\lambda r$, $\Delta\lambda g$, and $\Delta\lambda b$ from the reference wavelength serving as the wavelength deviation indicating values, from the solution of equations in the expressions 35, 36, and 37.

As described in background, the light emitting element configured of, for example, a semiconductor laser makes it possible to achieve the band optical characteristic acquisition means with simple configuration or low cost with use of a characteristic in which emission wavelength varies due to variation of environmental temperature or temperature increase by self-heating.

The band optical characteristic acquisition means may include a temperature detector that detects the temperature of the light emitting element supplying light of one wavelength band, in addition to a light amount detector that detects the light amount of the measurement-use output luminous flux (Fo'). The band optical characteristic acquisition means may generate the band optical characteristic acquisition data that includes light amount data detected by the light amount detector and temperature data detected by the temperature detector. In contrast, the integrated control circuit (Mc) may hold the correlation data between the temperature of the light emitting element and the variation of the emission wavelength, thereby acquiring the light emitting intensity indicating values correlated with light intensity and estimated wavelength deviation indicating values correlated with deviation from the reference wavelength in the wavelength band, on the basis of the band optical characteristic acquisition data acquired from the band optical characteristic acquisition means, even when the variation of the temperature and the variation of the emission wavelength are not linearly correlated with each other.

It is unnecessary to integrally configure the light amount detector and the temperature detector that configure the band optical characteristic acquisition means.

The light emitting element has a configuration to thermally contact with and hold a heatsink that includes an air-cooled, water-cooled, or electric cooling mechanism for dissipation of heat by the self-heating of energization. The electric cooling mechanism may be configured of, for example, a Peltier element. A groove may be preferably provided on a portion of a surface of the light emitting element that comes into contact with the heatsink or on a portion of a surface of the heatsink that comes into contact with the light emitting element, and the temperature detector may be preferably housed in the groove.

Non-limiting examples of the temperature detector may include a thermistor, a thermocouple, and a semiconductor temperature sensor.

Note that, when one or a plurality of light emitting elements belong to one wavelength band and a plurality of temperature detector are provided therefor, it is possible to calculate variation of the average value of the wavelengths, along with the temperature variation, from the average value of the wavelengths of all of the light emitting elements belonging to the same wavelength band at the reference temperature, from the emission wavelength of each of the light emitting elements at the predetermined reference temperature and the variation of the temperature of the light emitting element from the reference temperature, for the reason described for fluctuation of the emission wavelength. This allows for estimation of the general wavelength deviation indicating value.

When the power of the light emitting elements subjected to the temperature detection by the corresponding temperature detectors are varied among the temperature detectors, however, the general wavelength deviation indicating value may be desirably calculated through weighting average calculation in which the wavelength deviation indicating values estimated based on the detection temperature of each of the temperature detectors is weighted by the amount correlated with the power of the corresponding light emitting element, such as a current value.

Note that, as the simplest way, it is possible to calculate the average value (weighted average weighted by the amount correlated with the power of the light emitting element) of the temperatures detected by the respective temperature detectors, to estimate the general wavelength deviation indicating value.

Further, when the spectral sensitivity characteristics of the light amount detector are not flat in the wavelength band, correction may be desirably performed on the light amount data detected by the light amount detector, on the basis of the calculated general wavelength deviation indicating value.

For example, when the gradient of the spectral sensitivity in the wavelength band is 2%/nm and the calculated general wavelength deviation indicating value is 3 nm, the value 0.94 calculated by subtracting the value that is obtained by multiplying the integral wavelength deviation indicating value by the gradient of the spectral sensitivity, from 1, may be multiplied by the light amount data detected by the light amount detector to correct the light amount data.

As mentioned above, the main factor of the temperature variation of the light emitting element is the temperature increase by the self-heating caused by the power supplied from the drive circuit. Therefore, it is possible to realize the band optical characteristic acquisition means with simpler configuration or lower cost while paying attention to the fact that the temperature increase is correlated with the power supplied to the light emitting element.

The band optical characteristic acquisition means may include a power detector that detects the power of the light emitting element supplying light of one wavelength band, in addition to the light amount detector that detects the light amount of the measurement-use output luminous flux (Fo'). The band optical characteristic acquisition means may generate the band optical characteristic acquisition data that includes the light amount data detected by the light amount detector and power data detected by the power detector. In contrast, the integrated control circuit (Mc) may hold the correlation data between the power of the light emitting element and the variation of the emission wavelength, thereby acquiring the light emitting intensity indicating values correlated with light intensity and estimated wavelength deviation indicating value correlated with deviation from the reference wavelength, on the basis of the band optical characteristic acquisition data acquired from the band optical characteristic acquisition means, even when the variation of the power and the variation of the emission wavelength are not linearly correlated with each other.

It is unnecessary to integrally configure the light amount detector and the power detector that configure the band optical characteristic acquisition means.

Note that, as mentioned above, each of the drive circuits (P1a, P1b, ..., P2a, P2b, ...) has a function of supplying a specified power to corresponding one of the light emitting elements (Y1a, Y1b, ..., Y2a, Y2b, ...). Therefore, when the drive circuit includes power detection means that detects the power supplied to the corresponding light emitting element that is driven by the drive circuit itself, the drive circuit also functions as the power detector that acquires the wavelength deviation indicating value.

Accordingly, in this case, the drive circuits (P1a, P1b, ..., P2a, P2b, ...) includes a part of the functions of the band optical characteristic acquisition means (AiR, AiG, and AiB), and the integrated control circuit (Mc) receives a portion of the band optical characteristic acquisition data (ShR, ShG, and ShB) from the drive circuits (P1a, P1b, ..., P2a, P2b, ...) through the drive circuit control signals (J1a, J1b, ..., J2a, J2b, ...).

Since the value of the current flowing through the light emitting element and the value of the voltage generated in response to flowing of the current are also correlated with the power supplied to the light emitting element, the current value and the voltage value may be alternatively used as the value of the power detected for acquisition of the wavelength deviation indicating values.

[01] As mentioned just above, since the detected power of the light emitting element is alternative to the temperature of the light emitting element, the matter described for the case in which the general wavelength deviation indicating value is estimated on the basis of the temperature of the light emitting element is established as is by changing the target from the temperature to the power.

For example, for the above-described reason described for the fluctuation of the emission wavelength, it is possible to calculate variation of the average value of the wavelengths, along with the power variation, from the average value of the wavelengths of all of the light emitting elements belonging to the same wavelength band at the reference power, from the emission wavelength of each of the light emitting element at the predetermined reference temperature and the variation of the power of the light emitting element from the reference power. Accordingly, it is possible to estimate the general wavelength deviation indicating value, and it is sufficient to perform the processing when the spectral sensitivity characteristics of the light amount detector are not flat in the wavelength band, in a similar manner.

Further, since the emission wavelength of the light emitting element varies depending on the environmental temperature in addition to the self-heating amount, a temperature detector that detects the environmental temperature may be further provided, and correction may be performed, with use of the detected temperature, on the estimated wavelength deviation indicating value estimated based on the power.

Note that when the power values of the plurality of light emitting elements and the wavelength deviation indicating values are linearly correlated with one another, the general wavelength deviation indicating value may be estimated from the average value of the detected power values.

[01] It is necessary for the band optical characteristic acquisition means that estimates the wavelength deviation indicating value with use of the temperature or the power of the light emitting element to include the light amount detector as mentioned above, in addition to the temperature detector or the power detector.

As the light amount detector, an imaging element may be usable in addition to the light amount detector that detects the light amount.

In particular, since the imaging element for color photographing includes color filters of colors R, G, and B in the pixels, one imaging element advantageously generates the light amount data of the wavelength bands R, G, and B without adding a spectral filter even if the measurement-use luminous flux (Fo') is the light of white color that are obtained by mixing the colors R, G, and B.

[01] The configuration in which light is transmitted with use of the optical fiber has been described relating to FIG. 2. The optical fiber uses fragile glass such as quartz as a material, which disadvantageously has a risk of fracture.

If the optical fiber is fractured, optical power may be leaked from the fractured part of the optical fiber, and the leaked optical power may be absorbed by a covering material that is provided to mechanically protect the optical fiber, which may cause fire damage of the covering material. Therefore, measures for safety that detects occurrence of the fracture of the optical fiber and turns off the light emitting element are necessary.

When large power is transmitted as a whole, the power may be preferably transmitted through a plurality of optical fibers even if the color of light is the same, in terms of the configuration of the optical system and safety. In this case, not only the total light amount of all of the optical fibers but also the light amount of each of the optical fibers may be desirably monitored to individually detect fracture of each of the optical fibers.

As mentioned above, when the optical fibers are bundled such that the exit ends (Eo1, Eo2, . . . ) of the optical fibers are located on the same plane, projecting the image of the plane on which the exits ends (Eo1, Eo2, . . . ) are located to the imaging element with use of, for example, a lens allows for identification of the respective optical fibers to monitor the light amount of the respective optical fibers, thereby detecting fracture of the optical fibers individually.

[01] Next, specific configuration of the drive circuit of the light source unit according to the embodiment of the disclosure and more specific configuration of the optical fibers and subsequent to the exit ends of the optical fibers in a projector using the light source unit according to the embodiment of the disclosure are described with reference to FIG. 6 and FIG. 7 that are diagrams each illustrating one form of a portion of the light source unit according to the embodiment of the disclosure in a simplified manner.

Figure 6:
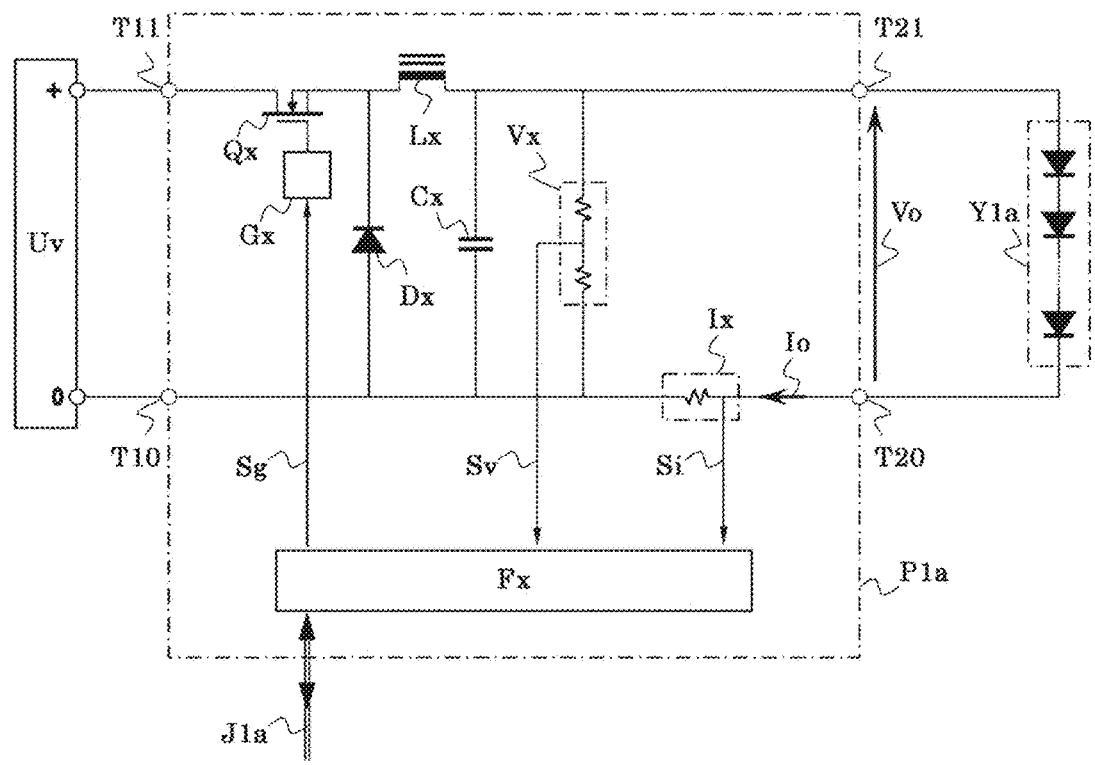
FIG. 6 is a schematic diagram illustrating one form of a portion of the light source unit according to the embodiment of the disclosure in a simplified manner.

[01] The drive circuit (Pa1) illustrated in FIG. 6 is a representative of the drive circuits (P1a, P1b, . . . , P2a, P2b, . . . ) of the light source unit according to the embodiment of the disclosure. FIG. 6 is a diagram illustrating a specific configuration example of the drive circuit (P1a).

The drive circuit (P1a) based on the step-down chopper circuit may operate in response to the voltage supplied from a DC power supply (Uv) that is coupled to nodes (T10 and T11), thereby adjusting the amount of power fed to the light emitting element (Y1a).

Note that the light emitting element (Y1a) is assumed to have a configuration in which a plurality of semiconductor lasers are coupled in series to one another.

In the drive circuit (P1a), on-off switching of the current from the DC power supply (Uv) may be performed by a switching element (Qx) such as an FET, and a smoothing capacitor (Cx) is charged through a choke coil (Lx). The voltage may be applied from nodes (T20 and T21) to the light emitting element (Y1a), and the current may accordingly flow through the light emitting element (Y1a).

[01] Note that, during a period in which the switching element (Qx) is turned on, the smoothing capacitor (Cx) may be directly charged by the current through the switching element (Qx), the current may be supplied to the light emitting element (Y1a) as a load, and energy may be stored as a magnetic flux in the choke coil (Lx). In contrast, during a period in which the switching element (Qx) is turned off, the current may be supplied to the light emitting element (Y1a) by discharge, through a fly wheel diode (Dx) from the smoothing capacitor (Cx), of the energy stored as the magnetic flux in the choke coil (Lx).

In such a step-down chopper drive circuit (P1a), it is possible to adjust the amount of power fed to the light emitting element (Y1a) at a ratio of the period in which the switching element (Qx) is turned on to an operation period of the switching element (Qx), namely, a duty cycle ratio.

In this case, a gate drive signal (Sg) having a certain duty cycle ratio may be generated by the drive control circuit (Fx), and a gate terminal of the switching element (Qx) may be controlled through a gate drive circuit (Gx). This allows for on-off control of the current supplied from the DC power supply (Uv).

[01] The output current Io flowing through the light emitting element (Y1a) may be detected by output current detection means (Ix), and the output voltage Vo applied to the light emitting element (Y1a) may be detected by output voltage detection means (Vx). The output current detection means (Ix) is easily realized by using a shunt resistor, and the output voltage detection means (Vx) is easily realized by using a voltage dividing resistor.

An output current signal (Si) detected by the output current detection means (Ix) and an output voltage signal (Sv) detected by the output voltage detection means (Vx) may be read by the drive control circuit (Fx).

The drive control circuit (Fx) may receive and transmit data to/from the integrated control circuit (Mc) through the drive circuit control signal (J1a), and maintain the target value of the power supplied to the light emitting element (Y1a) or the target value of the current flowing through the light emitting element (Y1a) correlated with the power. In addition, the drive control circuit (Fx) may compare the above-described target value with the value of the power of the light emitting element (Y1a) measured on the basis of the output current signal (Si) and the output voltage signal (Sv) (calculated on the basis of the product of the output current signal (Si) and the output voltage signal (Sv)) or the value of the current, thereby performing feedback control on the duty cycle ratio to decrease the difference therebetween.

The integrated control circuit (Mc) may read the value of the power or the current of the light emitting element (Y1a) through the drive circuit control signal (J1a), and use the value as an amount to acquire the above-described wavelength deviation indicating values.

Figure 7:
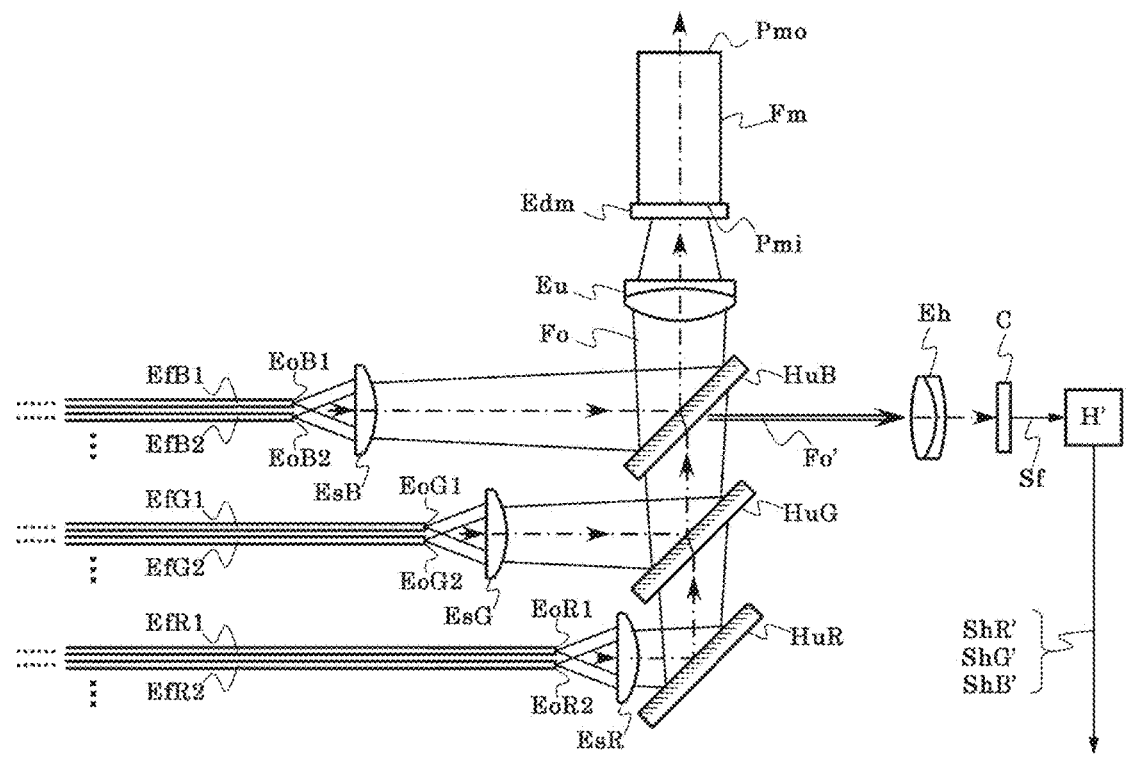
FIG. 7 is a schematic diagram illustrating one form of a portion of the light source unit according to the embodiment of the disclosure in a simplified manner.

[01] In contrast, FIG. 7 is a diagram illustrating a configuration of the optical fibers and subsequent to the exit ends of the optical fibers in the projector according to the embodiment of the disclosure.

The light source unit has a configuration in which a plurality of optical fibers for each of the three primary colors R, G, and B, namely, optical fibers for R light source (EfR1, EfR2, . . . ), optical fibers for G light source (EfG1, EfG2, . . . ), and optical fibers for B light source (EfB1, EfB2, . . . ) are configured as a fiber bundle whose respective exit ends are aligned and bundled, and luminous fluxes in which the light from the exit ends of the three fiber bundles are converted into infinite images by respective collimator lenses (EsR, EsG, and EsB) are color-synthesized with use of a mirror (HuR) and dichroic mirrors (HuG and HuB) to generate the output luminous flux (Fo) of the light source unit.

The output luminous flux (Fo) may enter a condensing lens (Eu), and the condensed output luminous flux then may enter an incident end (Pmi) of a homogenizing means (Fm) that is configured of a rod integrator, through a diffusion element (Edm) for removing speckles.

The optical system subsequent to an exit end (Pmo) of the homogenizing means (Fm) may be similar to that described with reference to FIG. 8 described above.

The light source unit according to the embodiment of the disclosure may be used in a projector that uses a homogenizing means configured of a fly eye integrator, described with reference to FIG. 9 described above.

Although the dichroic mirror (HuB) is so fabricated as to allow light of colors R and G to pass therethrough as much as possible and as to reflect light of B color as much as possible, reflected light of colors R and G and transmitted light of B color exist to no small extent, and such light is normally discarded as stray light. In the light source unit in FIG. 7, however, such light is effectively used to acquire the measurement-use output luminous flux (Fo').

The measurement-use output luminous flux (Fo') may enter an imaging optical system (Eh) that is configured of a lens, and an actual image that is conjugate with the R exit ends (EoR1, EoR2, . . . ), the G exit ends (EoG1, EoG2, . . . ), and the B exit ends (EoB1, EoB2, . . . ) of the fiber bundles may be formed on an imaging surface of an imaging element for color picture (C).

A picture signal (Sf) of the image imaged by the imaging element for color picture (C) may be transmitted to a signal processing circuit (H') in order to generate the light amount data (ShR', ShG', and ShB') of the respective wavelength bands R, G, and B.

The integrated control circuit (Mc) may acquire the light amount data (ShR', ShG', and ShB'), and acquire the power values or the current values of the light emitting elements (Y1a, Y1b, . . . Y2a, Y2b, . . . ) from the drive circuits (P1a, P1b, . . . , P2a, P2b, . . . ). The integrated control circuit (Mc) then may generate the light emitting intensity indicating values correlated with light intensity and the estimated wavelength deviation indicating values correlated with deviation from the reference wavelength in the above-described manner. Thereafter, the integrated control circuit (Mc) may perform the feedback control such that the difference between the light emitting intensity indicating values and the target values thereof for each of the wavelength bands becomes small.

In addition, the integrated control circuit (Mc) may separately measure the light amount of each of the R exit ends (EoR1, EoR2, . . . ), the G exit ends (EoG1, EoG2, . . . ), and the B exit ends (EoB1, EoB2, . . . ), and examine whether abnormality of light amount reduction occurs in any of the exit ends to monitor fracture of the optical fiber.

[01] In the above description, the band optical characteristic acquisition means (AiR) that measures the light emitting intensity indicating values correlated with the light intensity and measures the wavelength deviation indicating values with use of the wavelength dispersive optical element (Eg), the band optical characteristic acquisition means that estimates the wavelength deviation indicating value with use of the temperature of the light emitting element, and the band optical characteristic acquisition means that estimates the wavelength deviation indicating value with use of the power of the light emitting element have been described. The method and the configuration of the light source unit are not limited to those described above, and the light source unit according to the embodiment of the disclosure may use the means having any configuration as long as the means is able to measure and acquire these values.

In addition, the same type of the band optical characteristic acquisition means may be used for all of the band optical characteristic acquisition means (AiR, AiG, and AiB) of the respective wavelength bands R, G, and B, or different types of the band optical characteristic acquisition means may be mixedly used among the wavelength bands.

[01] In the present specification, the assumed case in which variation of the wavelength of the light emitting element occurs in all of the wavelength bands R, G, and B has been described to allow for typical discussion with respect to the most complicated situation.

However, when the light emitting elements include a light emitting element in which the wavelength variation do not occur or is ignorable in one wavelength band, the band optical characteristic acquisition means may acquire only the light emitting intensity indicating values correlated with the light intensity for the wavelength band, and calculation may be performed while the wavelength deviation indicating value corresponding to the wavelength band out of the wavelength deviation indicating values $\Delta\lambda r$, $\Delta\lambda g$, and $\Delta\lambda b$ is substituted with 0 in the expressions 8 to 14.

A semiconductor laser having stabilized oscillation wavelength, a semiconductor laser having a resonance reflector that is configured of a volume Bragg diffraction grating, a non-linear optical harmonic oscillator, and other lasers actually include a light emitting element handled in such a way.

For example, in the case of the G wavelength band, an optical sensor having sensitivity for the G wavelength band may be provided, and the light emitting intensity indicating value Sg acquired by measuring the light amount of the measurement-use output luminous flux (Fo') and the wavelength deviation indicating value $\Delta\lambda g=0$ may be applied to the expressions 8 to 14.

The number of such wavelength bands in which the wavelength variation do not substantially occur or is ignorable is not limited to one, and the disclosure is applicable and favorably operates even when the number of such wavelength bands is two.

Note that, in the present specification, the case in which the chromaticity coordinates (Yxy color system) and the tristimulus values (XYZ color system) are used as the color phase indicating values correlated with light colors used in the processing inside the light source unit, has been specifically described. Any other color system that has color phase indicating values correlated with the chromaticity coordinates, for example, RGB color system, L*u*v* color system, or L*a*b* color system may be optionally used.

In addition, the term "slight variation" is used in some description in the present specification. The term indicates the variations Δλ, Δu, Δv, and Δw of the respective values λ, u, v, and w that are expectantly provided to actually establish the approximate expressions such as the above-described expressions 7 and 20. Although accuracy of approximation is normally improved as the variation become small, the approximation is practical even if the variation is large, depending on lowness of the desired accuracy. Accordingly, the allowable variation is determined in accordance with the intended purpose of the light source unit.

The embodiment of the disclosure is available in industries designing and manufacturing a light source unit that is usable in an optical apparatus such as a projector and uses a light emitting element such as a semiconductor laser, for a plurality of different wavelength bands. It should be understood by those skilled in the art that various modifications, combinations, sub-combinations, and alterations may occur depending on design requirements and other factors insofar as they are within the scope of the appended claims or the equivalents thereof.

What is claimed is:

1. A light source unit, comprising:
a plurality of elemental light sources each including light emitting elements and drive circuits, the light emitting elements that emit light of an emission wavelength including a plurality of different wavelength bands, and the drive circuits respectively driving the light emitting elements;
an integrated control circuit that controls the drive circuits; and
band optical characteristic acquisition sections that receive light of an amount correlated with a total light amount of output luminous fluxes, acquire light emitting intensity indicating values correlated with light intensity for the respective different wavelength bands and acquire wavelength deviation indicating values correlated with deviation from a reference wavelength for one or more of the different wavelength bands, the output luminous fluxes being collection of light beams emitted from light emitting elements,
wherein the integrated control circuit at least intermittently acquires band optical characteristic acquisition data and generate the light emitting intensity indicating values and the wavelength deviation indicating values, the band optical characteristic acquisition data being generated by the band optical characteristic acquisition sections,
the integrated control circuit holds light emitting intensity indicating value target variation information, the light emitting intensity indicating value target variation information being used to reduce difference between color phase indicating values correlated with the integrated light color of the output luminous fluxes and target color phase indicating values by feedback control of the drive circuits, the feedback control being performed to reduce difference between the light emitting intensity indicating values and target light emitting intensity indicating values for the respective different wavelength bands, and the light emitting intensity indicating value target variation information being used for determination of variation of the light emitting intensity indicating values with respect to the target light emitting intensity indicating values for the respective different wavelength bands matched to each of assumed appearance modes of the wavelength deviation indicating values, and
the integrated control circuit determines the variation of the light emitting intensity indicating values for the respective different wavelength bands, in accordance with the light emitting intensity indicating value target variation information belonging to one appearance mode assumed on a basis of an actual mode of the generated wavelength deviation indicating values, out of the appearance modes of the wavelength deviation indicating values.

2. The light source unit according to claim 1, wherein the light emitting intensity indicating value target variation information held by the integrated control circuit is calculated and generated by solving an equation, the equation representing, using the variation of the light emitting intensity indicating values, variation of the color phase indicating values when the light emitting intensity indicating values are slightly varied for the respective different wavelength bands.

3. The light source unit according to claim 1, wherein the integrated control circuit determines the variation of the light emitting intensity indicating values for the respective different wavelength bands to reduce difference between brightness indicating values and target brightness indicating values, the brightness indicating values being correlated with total brightness of light of the output luminous fluxes.

4. The light source unit according to claim 1, wherein
the band optical characteristic acquisition sections each include:
a wavelength dispersive optical element that changes a traveling direction of light included in a received measurement-use output luminous flux on a basis of a wavelength of the light, and
an imaging element that detects a distribution pattern formed rearward by the light of which the traveling direction is changed by the wavelength dispersive optical element, and
the band optical characteristic acquisition sections each generate the band optical characteristic acquisition data with use of the wavelength dispersive optical element and the imaging element.

5. The light source unit according to claim 1, wherein
one of the band optical characteristic acquisition sections for one or more of the different wavelength bands includes:
a first light amount measurement section having first spectral sensitivity characteristics relating to spectral sensitivity characteristics of the one or more of the wavelength bands, and
a second light amount measurement section having second spectral sensitivity characteristics that are different in variation rate of sensitivity with respect to wavelength variation from the first spectral sensitivity characteristics, and
the integrated control circuit holds local band spectral sensitivity information that includes variation rates of the sensitivity with respect to the wavelength variation and a sensitivity value at a reference wavelength of the first spectral sensitivity characteristics and the second spectral sensitivity characteristics, and
the integrated control circuit acquires first light amount measurement data serving as the band optical characteristic acquisition data generated by the first light amount measurement sections and second light amount measurement data serving as the band optical characteristic acquisition data generated by the second light amount measurement sections, and uses the local band spectral sensitivity information to generate and acquire the light emitting intensity indicating values and the wavelength deviation indicating values on a basis of the first light amount measurement data and the second light amount measurement data.

6. The light source unit according to claim 1, wherein the band optical characteristic acquisition sections each include:

a light amount detector that detects a light amount of the received measurement-use output luminous flux, and a temperature detector that detects temperature of the light emitting elements, the band optical characteristic acquisition sections each generate the band optical characteristic acquisition data with use of the light amount detector and the temperature detector, and the integrated control circuit estimates the wavelength deviation indicating values on a basis of the detected temperature of the light emitting elements.

7. The light source unit according to claim 1, wherein the band optical characteristic acquisition sections each include:

a light amount detector that detects a light amount of the received measurement-use output luminous flux, and a power detector that detects an amount correlated with power supplied to the light emitting elements, the band optical characteristic acquisition sections each generate the band optical characteristic acquisition data with use of the light amount detector and the power detector, and the integrated control circuit estimates the wavelength deviation indicating values on a basis of the detected power supplied to the light emitting elements.

8. The light source unit according to claim 6, wherein the light amount detector is an imaging element.

9. A projector comprising the light source unit according to claim 1 and a projection display section that projects an image using the light source unit.

* * * * *